(12) United States Patent
Brune et al.

(10) Patent No.: US 10,808,664 B2
(45) Date of Patent: *Oct. 20, 2020

(54) TAPPET ASSEMBLY FOR USE IN A HIGH-PRESSURE FUEL SYSTEM OF AN INTERNAL COMBUSTION ENGINE

(71) Applicant: GT Technologies, Westland, MI (US)

(72) Inventors: John E. Brune, Stockbridge, MI (US); Luke Gossman, Canton, MI (US); Dennis Landis, Toledo, OH (US)

(73) Assignee: GT TECHNOLOGIES, Westland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,004

(22) Filed: Jun. 4, 2019

(65) Prior Publication Data
US 2019/0368455 A1 Dec. 5, 2019

Related U.S. Application Data

(60) Provisional application No. 62/680,287, filed on Jun. 4, 2018.

(51) Int. Cl.
*F02M 59/10* (2006.01)
*F01L 1/14* (2006.01)
*F02M 59/44* (2006.01)

(52) U.S. Cl.
CPC .......... *F02M 59/102* (2013.01); *F01L 1/14* (2013.01); *F01L 1/143* (2013.01); *F02M 59/44* (2013.01)

(58) Field of Classification Search
CPC .... F02M 59/102; F02M 59/44; F02M 45/063; F01L 1/14; F01L 1/143; F01L 2105/00; F01L 2107/00; F16H 53/06

USPC .......... 123/90.48, 90.49, 90.5; 92/129, 187, 92/165 PR; 74/569
See application file for complete search history.

(56) References Cited

U.S. PATENT DOCUMENTS

| 7,793,583 B2 | 9/2010 | Radinger et al. |
| 8,235,018 B2 | 8/2012 | Dorn et al. |
| 8,474,427 B2 | 7/2013 | Dorn et al. |

(Continued)

FOREIGN PATENT DOCUMENTS

DE 102011085243 A1 5/2013

OTHER PUBLICATIONS

Notice of Allowance dated Feb. 26, 2020 for related U.S. Appl. No. 16/450,105.

*Primary Examiner* — Devon C Kramer
*Assistant Examiner* — Kelsey L Stanek
(74) *Attorney, Agent, or Firm* — Howard & Howard Attorneys PLLC

(57) ABSTRACT

A tappet assembly for use in translating force between a camshaft lobe and a fuel pump assembly via reciprocal movement within a tappet cylinder having a guide slot. The tappet assembly comprises a tappet body defining a pair of apertures and a pair of seats, and a follower assembly. The follower assembly has a shaft, a first bearing and a second bearing, each supported on the shaft for engaging the camshaft lobe. An intermediate element is further supported on the shaft between the first and second bearings and has a platform for engaging the fuel pump assembly. The intermediate element is at least partially disposed in the pair of seats of the tappet body and the shaft is disposed in the pair of apertures of the tappet body.

18 Claims, 16 Drawing Sheets

(56) References Cited

U.S. PATENT DOCUMENTS

| | | | |
|---|---|---|---|
| 8,522,643 B2 | 9/2013 | Dorn et al. | |
| 8,863,716 B2 | 10/2014 | Dorn et al. | |
| 8,875,676 B2* | 11/2014 | Geyer | F02M 59/102 |
| | | | 123/90.48 |
| D739,440 S | 9/2015 | Cornett et al. | |
| 2008/0190237 A1 | 8/2008 | Radinger et al. | |
| 2011/0265752 A1* | 11/2011 | Dorn | F04B 53/22 |
| | | | 123/90.48 |
| 2012/0125277 A1* | 5/2012 | Chambonneau | F04B 1/0417 |
| | | | 123/90.48 |
| 2012/0152187 A1* | 6/2012 | Cornett | F01L 1/143 |
| | | | 123/90.5 |
| 2012/0234277 A1* | 9/2012 | Dorn | F01L 1/146 |
| | | | 123/90.48 |
| 2013/0213181 A1* | 8/2013 | Dorn | F02M 59/102 |
| | | | 74/569 |
| 2015/0090209 A1* | 4/2015 | Berruet | F02M 37/06 |
| | | | 123/90.26 |
| 2016/0084116 A1* | 3/2016 | Ludwig | F01L 1/14 |
| | | | 123/90.48 |
| 2016/0091073 A1 | 3/2016 | Berruet et al. | |
| 2016/0160986 A1* | 6/2016 | Berruet | F04B 9/042 |
| | | | 74/569 |
| 2016/0230868 A1* | 8/2016 | Champalou | F16H 53/06 |
| 2017/0016418 A1* | 1/2017 | Brune | F02M 59/06 |
| 2019/0368456 A1* | 12/2019 | Brune | F16H 53/06 |

\* cited by examiner

TAPPET ASSEMBLY FOR USE IN A HIGH-PRESSURE FUEL SYSTEM OF AN INTERNAL COMBUSTION ENGINE

CROSS-REFERENCE TO RELATED APPLICATIONS

The subject patent application claims priority to and all the benefits of U.S. Provisional Patent Application No. 62/680,287, filed on Jun. 4, 2018, the entire content of which is hereby incorporated by reference herein.

BACKGROUND

Conventional internal combustion engines typically include one or more camshafts in rotational communication with a crankshaft supported in a block, one or more intake and exhaust valves driven by the camshafts and supported in a cylinder head, and one or more pistons driven by the crankshaft and supported for reciprocal movement within cylinders of the block. The pistons and valves cooperate to regulate the flow and exchange of gases in and out of the cylinders of the block so as to effect a complete thermodynamic cycle in operation. To this end, a predetermined mixture of air and fuel is compressed by the pistons in the cylinders, is ignited and combusts, which thereby moves the piston within the cylinder to transfer energy to the crankshaft. The mixture of air and fuel can be delivered in a number of different ways, depending on the specific configuration of the engine.

Irrespective of the specific configuration of the engine, contemporary engine fuel systems typically include a pump adapted to pressurize fuel from a source (e.g., a fuel tank) and to direct pressurized fuel to one or more fuel injectors selectively driven by an electronic controller. Here, the fuel injectors atomize the pressurized fuel, which promotes a substantially homogenous mixture of fuel and air used to effect combustion in the cylinders of the engine.

In so-called "port fuel injection" (PFI) gasoline fuel systems, the fuel injectors are arranged up-stream of the intake valves of the cylinder head, are typically attached to an intake manifold, and are used to direct atomized fuel toward the intake valves which mixes with air traveling through the intake manifold and is subsequently drawn into the cylinders. In conventional PFI gasoline fuel systems, a relatively low fuel pressure of 4 bar (approximately 58 psi) is typically required at the fuel injectors. Because the pressure demand of PFI gasoline fuel systems is relatively low, the pump of a PFI gasoline fuel system is typically driven with an electric motor.

In order to increase the efficiency and fuel economy of conventional internal combustion engines, the current trend in the art involves so-called "direct fuel injection" (DFI) fuel system technology, in which the fuel injectors introduce atomized fuel directly into the cylinder of the block (rather than up-stream of the intake valves) so as to effect improved control and timing of the thermodynamic cycle of the engine. To this end, modern gasoline DFI fuel systems operate at relatively high fuel pressures, for example 500 bar or higher (approximately 7300 psi). Because the pressure demand of DFI fuel systems is relatively high, a high-pressure fuel pump assembly which is mechanically driven by a rotational movement of a prime mover of the engine (e.g., one of the camshafts) is typically employed. Thus, in many embodiments, the same camshaft used to regulate valves in the cylinder head is also used to drive the high-pressure fuel pump assembly in DFI fuel systems. To this end, one of the camshafts typically includes an additional lobe that cooperates with a tappet supported in a housing to translate rotational movement of the camshaft lobe into linear movement of the high-pressure fuel pump assembly.

The high-pressure fuel pump assembly is typically removably attached to the housing with fasteners. The housing of the high-pressure fuel pump assembly may be formed as a discrete component, or may be realized as a part of the cylinder head, and includes a tappet cylinder in which the tappet is supported for reciprocating movement.

The tappet typically includes a bearing which engages the lobe of the camshaft, and a body which supports the bearing and is disposed in force-translating relationship with the high-pressure fuel pump assembly. Here, the high-pressure fuel pump assembly typically includes a spring-loaded piston which is pre-loaded against the tappet body when the high-pressure fuel pump assembly is attached to the housing. Thus, rotational movement of the lobe of the camshaft moves the tappet along the tappet cylinder of the housing which, in turn, translates force to the piston of the high-pressure fuel pump assembly to displace and pressurize fuel. As the lobe of the camshaft continues to rotate, potential energy stored in the spring-loaded piston of the high-pressure fuel pump assembly urges the tappet back down the tappet cylinder such that engagement is maintained between the bearing of the tappet and the lobe of the camshaft.

During engine operation, and particularly at high engine rotational speeds, close tolerance must be maintained between the lobe of the camshaft, the tappet, and the piston of the high-pressure fuel pump assembly. Excessive tolerance may result in poor performance as well as increased wear, which leads to significantly decreased component life. Thus, it will be appreciated that it is important to maintain predetermined tolerances between the lobe of the camshaft, the tappet, and the piston of the high-pressure fuel pump assembly under varying engine operating conditions, such as engine rotational speed or operating temperature.

Each of the components of an internal combustion engine high-pressure fuel system of the type described above must cooperate to effectively translate movement from the lobe of the camshaft so as to operate the high-pressure fuel pump assembly at a variety of engine rotational speeds and operating temperatures and, at the same time, maintain correct tolerances so as to ensure proper performance. In addition, each of the components must be designed not only to facilitate improved performance and efficiency, but also so as to reduce the cost and complexity of manufacturing and assembling the fuel system, as well as reduce wear in operation. While internal combustion engine high-pressure fuel systems known in the related art have generally performed well for their intended purpose, there remains a need in the art for a high-pressure fuel system that has superior operational characteristics, and, at the same time, reduces the cost and complexity of manufacturing the components of the fuel system.

SUMMARY

The present invention overcomes the disadvantages in the related art in a tappet assembly for use in translating force between a camshaft lobe and a fuel pump assembly via reciprocal movement within a tappet cylinder having a guide slot. The tappet assembly includes a follower assembly having a shaft and first and second bearings rotatably supported by the shaft for engaging the camshaft lobe. The tappet assembly further includes an intermediate element disposed between the first and second bearings and coupled to the follower assembly. The intermediate element includes a platform for engaging the high-pressure fuel pump assembly. The tappet assembly further includes a tappet body with the intermediate element and the follower assembly each disposed therein.

In this way, the tappet assembly of the present invention significantly reduces the complexity of manufacturing high-pressure fuel systems. Moreover, the present invention reduces the cost of manufacturing high-pressure fuel systems that have superior operational characteristics, such as improved engine performance, control, and efficiency, as well as reduced vibration, noise generation, engine wear, emissions, and packaging size.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION

Figure 1:
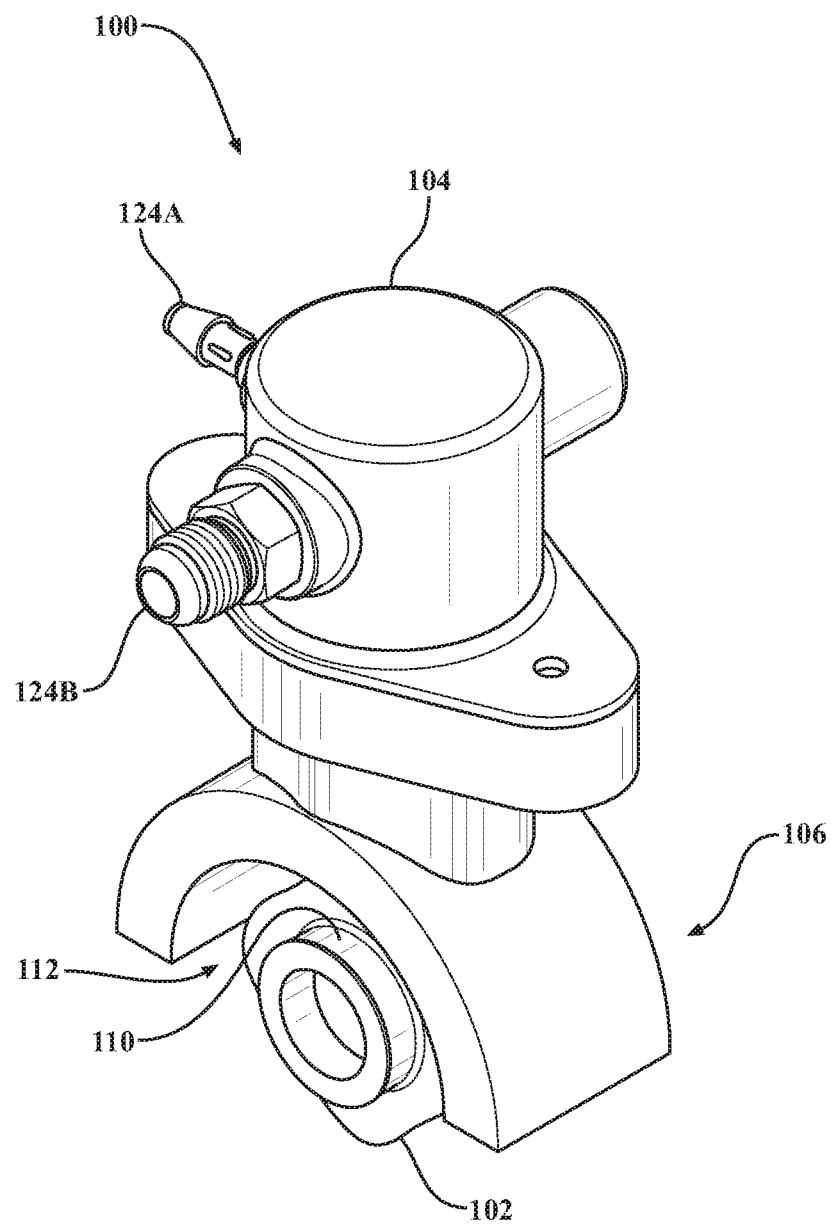
FIG. 1 is a perspective view of a high-pressure fuel system, shown depicting portions of a fuel pump assembly, a camshaft lobe, and a housing.
Figure 2:
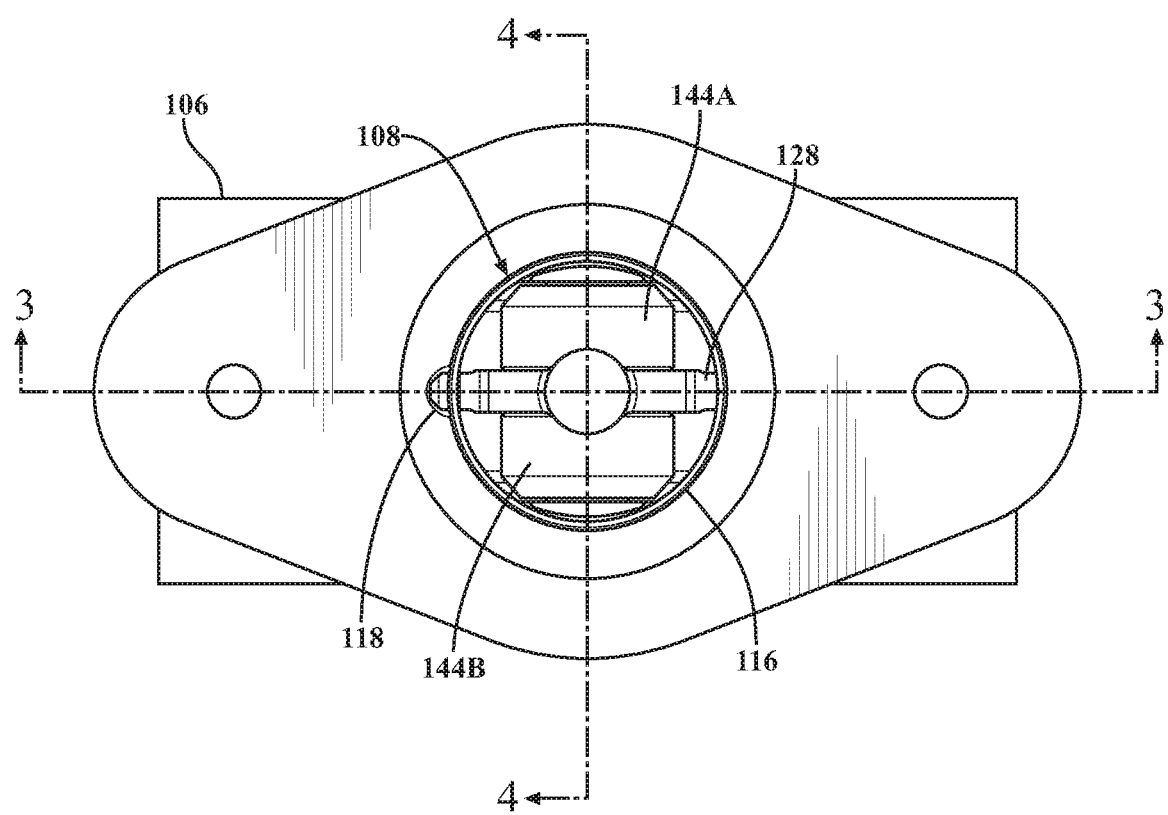
FIG. 2 is a top-side plan view of portions of the high-pressure fuel system of FIG. 1, shown without the fuel pump assembly and shown depicting a tappet assembly according to a first embodiment of the present invention supported within a tappet cylinder of the housing.

Referring now to the drawings, wherein like numerals are used to designate like structure, portions of a high-pressure fuel system for an internal combustion engine are generally depicted at 100 in FIGS. 1-5. The high-pressure fuel system 100 includes a camshaft lobe 102, a high-pressure fuel pump assembly 104, a housing 106, and a tappet assembly 108. Each of these components will be described in greater detail below.

Figure 3:
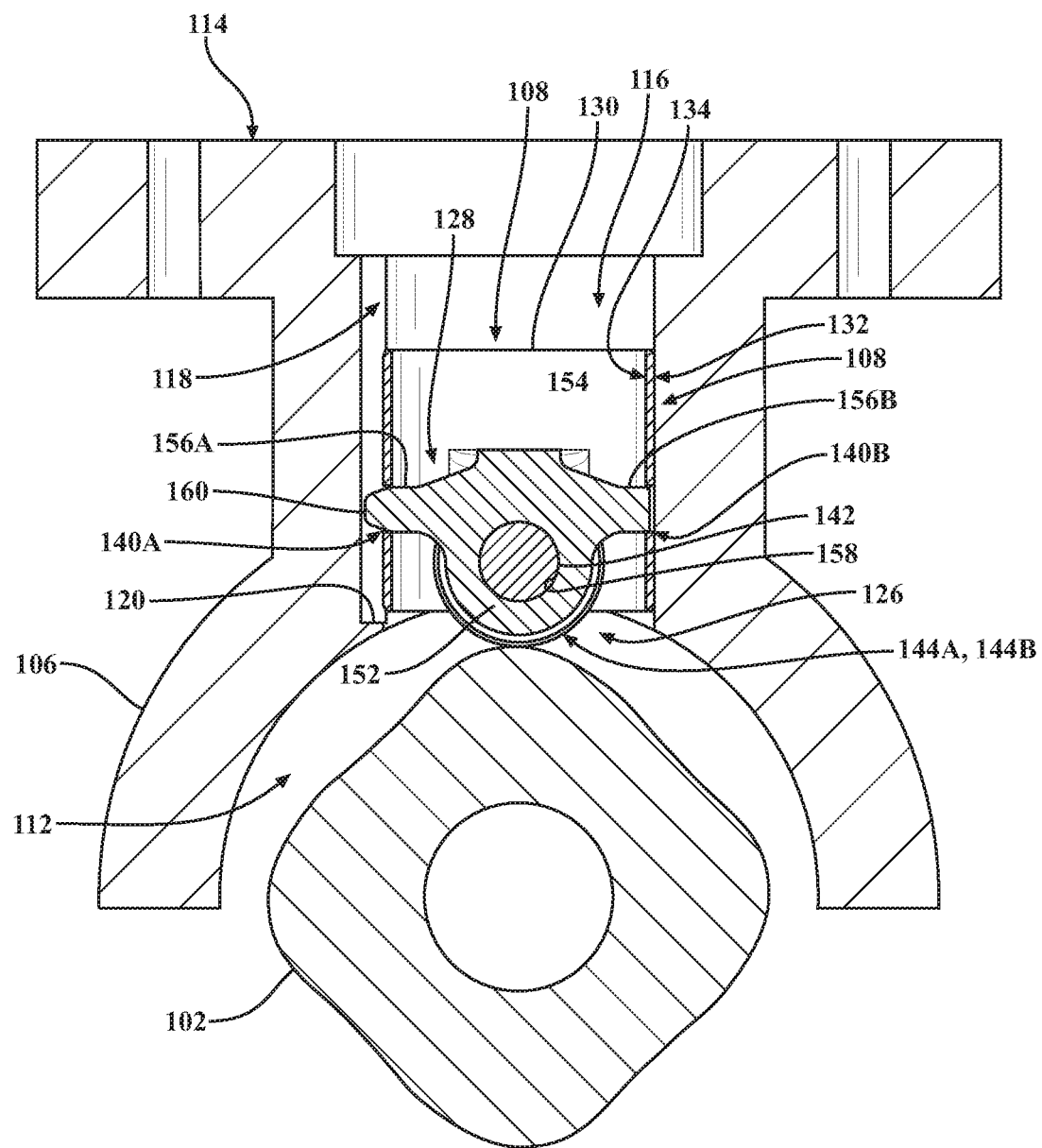
FIG. 3 is a section view taken along line 3-3 in FIG. 2, shown depicting portions of the housing, the tappet assembly, and the camshaft lobe.

The camshaft lobe 102 is typically integrated with a camshaft 110 rotatably supported in a cylinder head or engine block of an internal combustion engine (not shown, but generally known in the related art). As is best shown in FIG. 3, the illustrated camshaft lobe 102 has a generally rounded eccentric profile and is used to drive the high-pressure fuel pump assembly 104, as described in greater detail below. Here, four camshaft lobes 102 are arranged in a rounded-rectangular pattern within the housing 106 and rotate within a housing chamber 112 defined by the housing 106.

For the purposes of clarity and consistency, only portions of the camshaft 110, the housing 106, and the housing chamber 112 that are disposed adjacent the camshaft lobe 102 are illustrated herein. Thus, it will be appreciated that the camshaft 110, housing 106, and/or the housing chamber 112 could be configured or arranged in a number of different ways sufficient to cooperate with the high-pressure fuel pump assembly 104 without departing from the scope of the present invention. Specifically, the camshaft 110 and camshaft lobe 102 illustrated herein may be integrated with or otherwise form a part of a conventional engine valvetrain system configured to regulate the flow of gases into and out of the engine (not shown, but generally known in the related art). Moreover, it will be appreciated that the camshaft 110 and/or the camshaft lobe 102 could be configured, disposed, or supported in any suitable way sufficient to operate the high-pressure fuel pump assembly 104 without departing from the scope of the present invention. Further, while the camshaft lobe 102 described herein receives rotational torque directly from the engine, those having ordinary skill in the art will appreciate that the camshaft lobe 102 could be disposed in rotational communication with any suitable prime mover sufficient to operate the high-pressure fuel pump assembly 104 without departing from the scope of the present invention.

As noted above, only the portions of the housing 106 and housing chamber 112 adjacent to the camshaft lobe 102 are illustrated throughout the drawings. Those having ordinary skill in the art will appreciate that the housing 106 and housing chamber 112 illustrated in FIGS. 1-5 could be formed or otherwise supported independent of the engine, or could be integrated with any suitable portion of the engine or another part of a vehicle powertrain without departing from the scope of the present invention. The housing 106 includes a flange 114, which is adapted to releasably secure the high-pressure fuel pump assembly 104, such as with bolts or other fasteners (not shown, but generally known in the related art). The housing 106 also includes a tappet cylinder 116, which extends between the housing chamber 112 and the flange 114. Here, the tappet assembly 108 is supported for reciprocal movement along the tappet cylinder 116 of the housing 106, as described in greater detail below. The tappet cylinder 116 also includes a guide slot 118, which extends between the flange 114 and the housing chamber 112 for indexing the angular position of the tappet assembly 108 with respect to the camshaft lobe 102 (see FIGS. 2, 3, and 5). As is best shown in FIG. 3, the guide slot 118 extends to a guide slot end 120 disposed adjacent to and spaced from the housing chamber 112. It will be appreciated that the guide slot end 120 helps prevent the tappet assembly 108 from inadvertently falling into the housing chamber 112 in the absence of the camshaft 110 (e.g., during engine assembly and/or disassembly).

Figure 5:
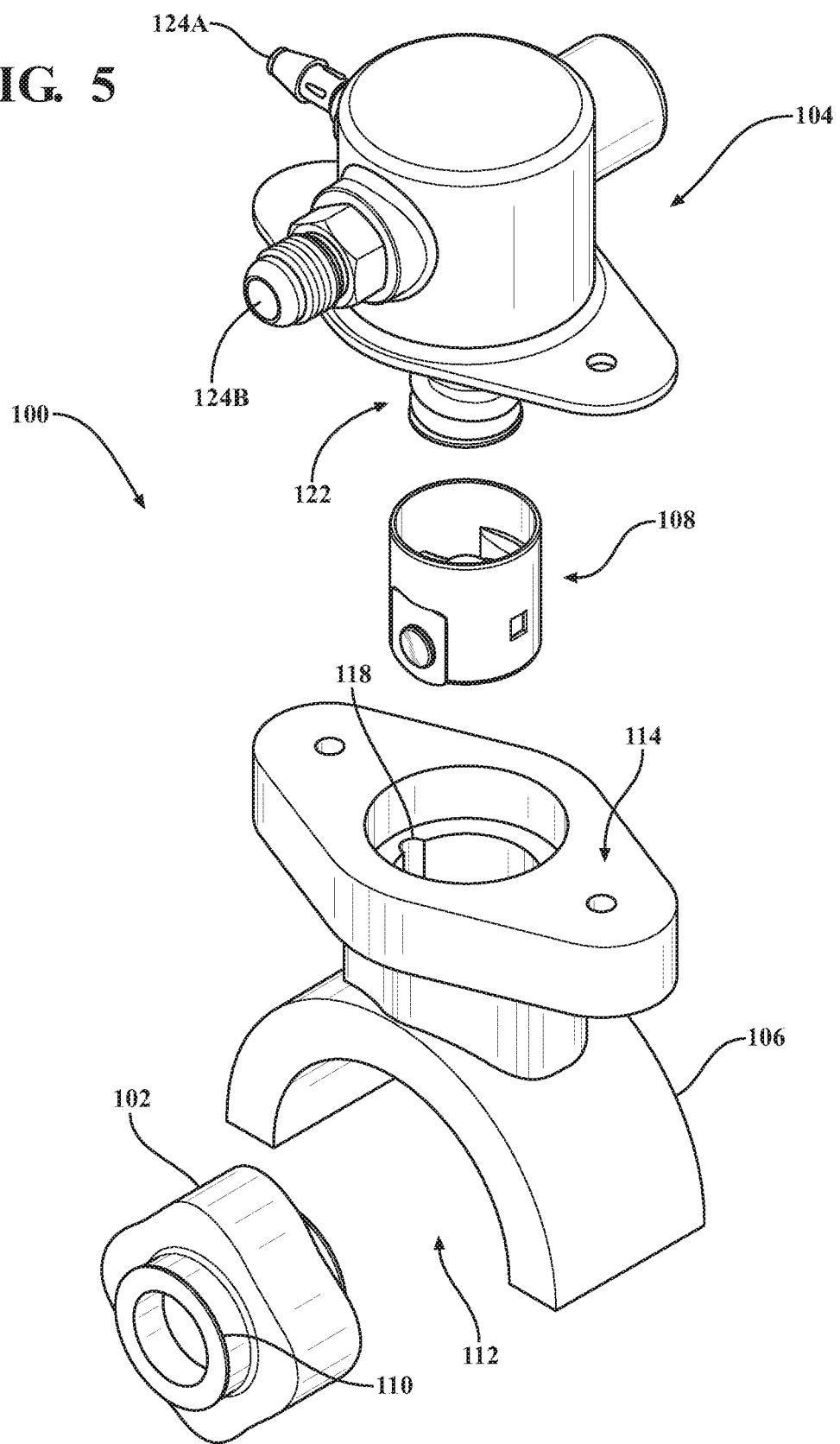
FIG. 5 is an exploded perspective view of the high-pressure fuel system of FIG. 1, shown with the camshaft lobe, the fuel pump assembly, and the first embodiment of the tappet assembly of FIGS. 2-4 spaced from the housing.

As shown in FIG. 5, the high-pressure fuel pump assembly 104 includes a spring-loaded piston, generally indicated at 122, which is pre-loaded against the tappet assembly 108 when the high-pressure fuel pump assembly 104 is attached to the flange 114 of the housing 106. The high-pressure fuel pump assembly 104 includes a low-pressure port 124A and a high-pressure port 124B. The low-pressure port 124A is typically disposed in fluid communication with a source of fuel such as a fuel tank or a conventional low-pressure fuel system (not shown, but generally known in the related art). Similarly, the high-pressure port 124B is typically disposed in fluid communication with a fuel injector used to facilitate admission of fuel into the engine (not shown, but generally known in the related art). However, those having ordinary skill in the art will appreciate that the high-pressure fuel pump assembly 104 could be configured in any suitable way, with any suitable number of ports, components, and the like, without departing from the scope of the present invention.

Rotational movement of the camshaft lobe 102 effects reciprocal movement the tappet assembly 108 along the tappet cylinder 116 of the housing 106 which, in turn, translates force to the spring-loaded piston 122 of the high-pressure fuel pump assembly 104 so as to pressurize fuel across the ports 124A, 124B. As the camshaft lobe 102 continues to rotate, potential energy stored in the spring-loaded piston 122 of the high-pressure fuel pump assembly 104 urges the tappet assembly 108 back down the tappet cylinder 116 so as to ensure proper engagement between the tappet assembly 108 and the camshaft lobe 102, as described in greater detail below.

As noted above, nine embodiments of the tappet assembly of the present invention are illustrated throughout the drawings. As will be appreciated from the subsequent description below, each of these embodiments are configured according to the present invention and facilitate translating force between the camshaft lobe 102 of the camshaft 110 and the spring-loaded piston 122 of the high-pressure fuel pump assembly 104 to effect operation of the high-pressure fuel system 100 (see FIGS. 1-5). While the specific structural differences between each of these embodiments will be described in detail herein, for the purposes of clarity and consistency, subsequent discussion of the tappet assembly 108 will initially refer to a first embodiment.

Referring now to FIGS. 2-8, the first embodiment of the tappet assembly 108 is shown. The tappet assembly 108 generally includes a follower assembly 126, an intermediate element 128, and a tappet body 130, each of which will be described in greater detail below.

Figure 6:
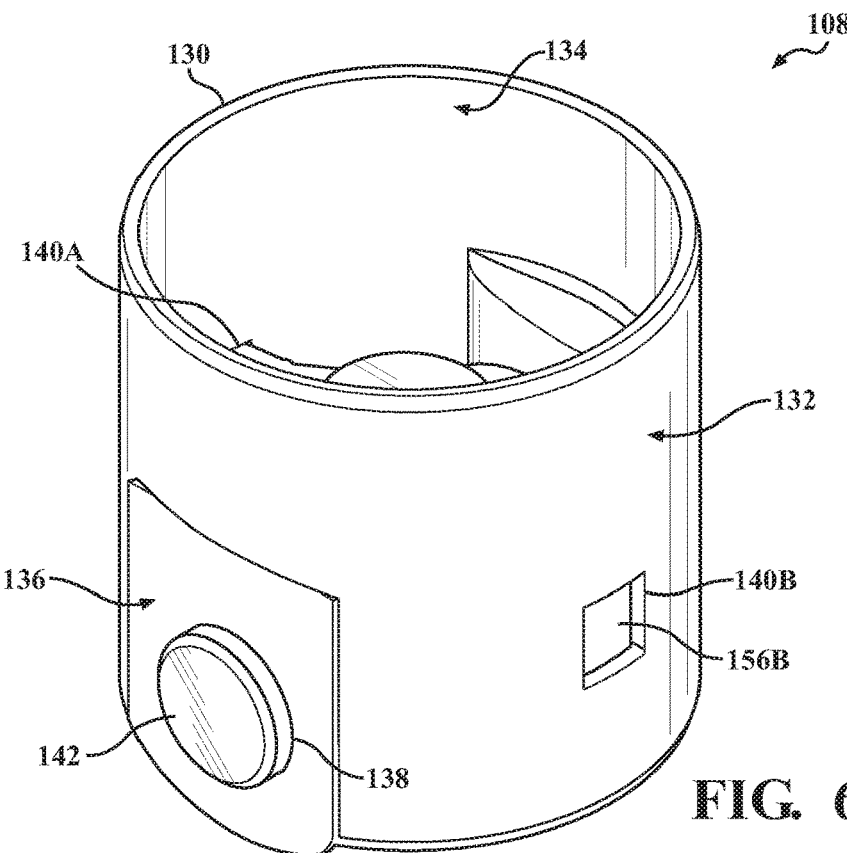
FIG. 6 is a perspective view of the first embodiment of the tappet assembly of FIGS. 2-5.
Figure 7:
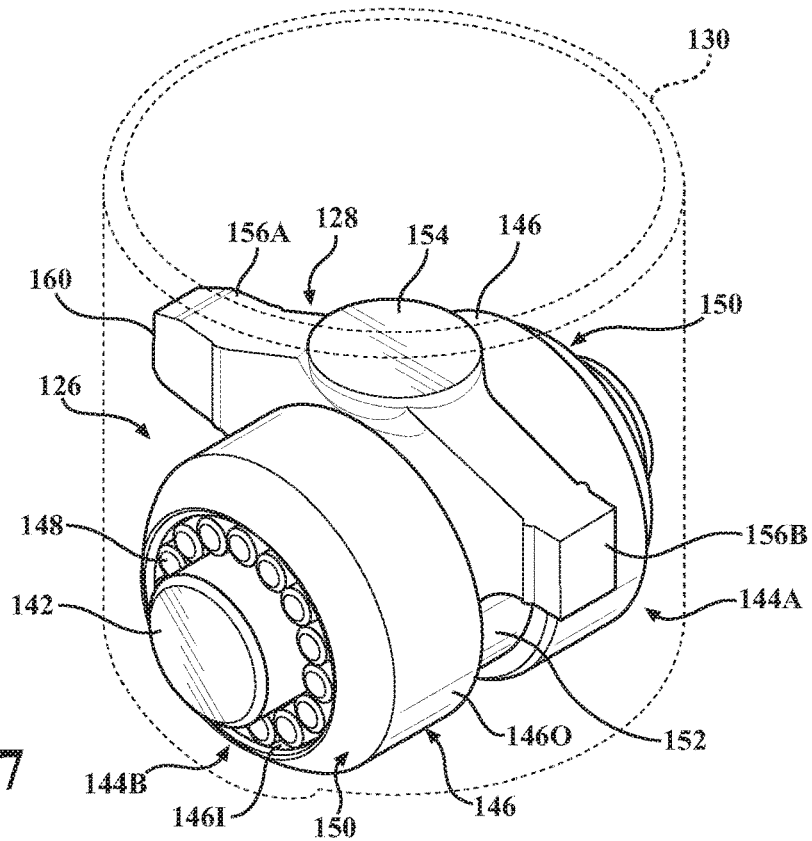
FIG. 7 is an enlarged partial perspective view of the first embodiment of the tappet assembly of FIGS. 2-5, shown having a follower assembly supported within a tappet body, the tappet body shown depicted in phantom.
Figure 8:
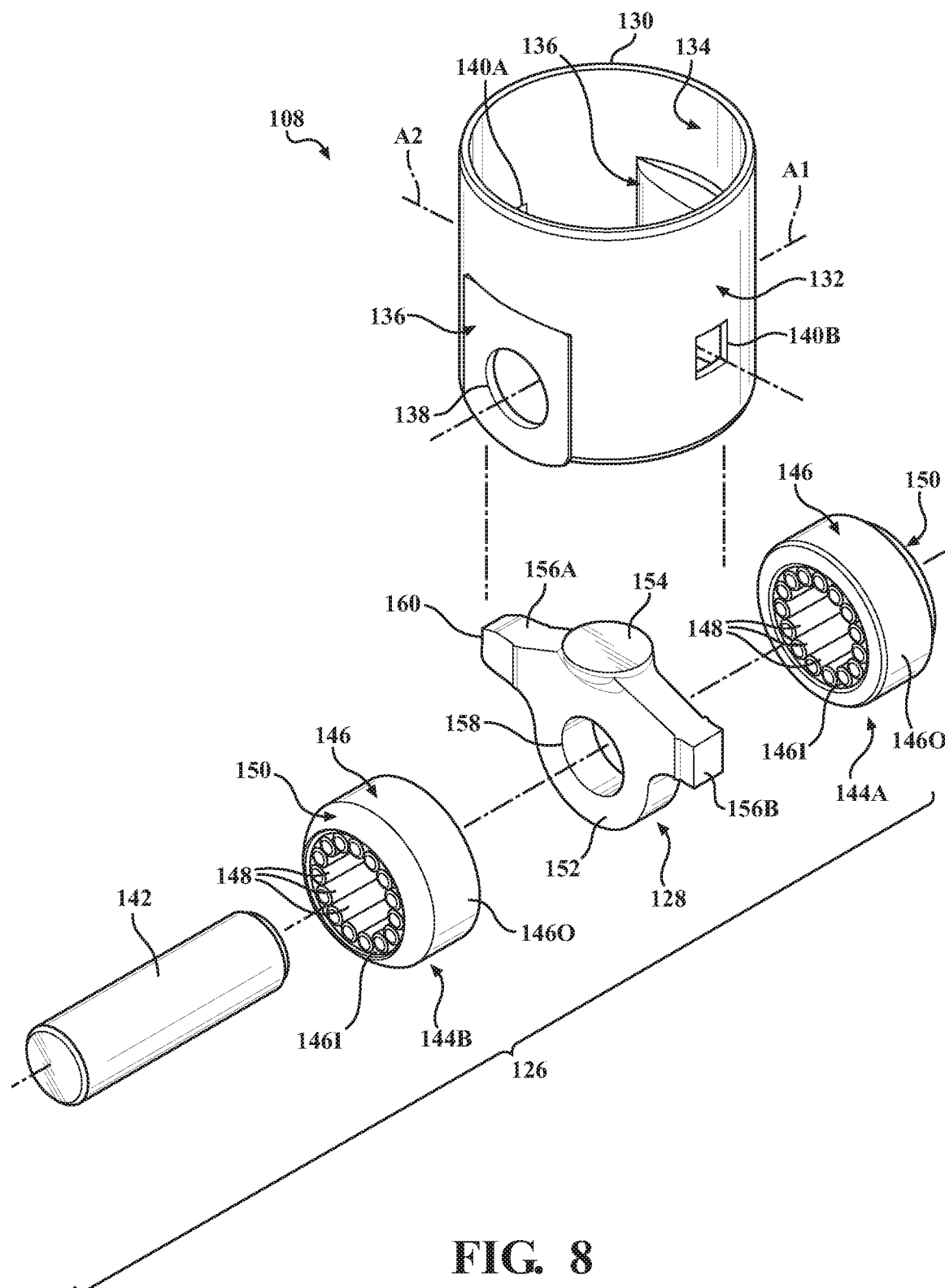
FIG. 8 is a partially-exploded perspective view of the first embodiment of the tappet assembly of FIGS. 2-6.

As is best shown in FIGS. 6-8, the tappet body 130 of the tappet assembly 108 has a generally cylindrical shape and defines an outer surface 132 and an inner surface 134, each of which have a generally annular profile. Two indented walls 136 are formed on the tappet body 130 and are diametrically opposed from each other. An aperture 138 is formed in each indented wall 136 extending from the outer surface 132 to the inner surface 134 (see also FIG. 4). The apertures 138 each have a substantially circular profile, are aligned with each other about an aperture axis A1 (see FIG. 8), and cooperate to support the follower assembly 126, as described in greater detail below. An ear may be formed on each indented wall 136 that extends beneath the tappet body 130 to provide greater strength to the tappet body 130. The tappet body 130 of the tappet assembly 108 also comprises first and second seats 140A, 140B, which are likewise formed extending from the outer surface 132 to the inner surface 134 (see also FIG. 3). The first and second seats 140A, 140B are also diametrically opposed from each other, and are aligned with each other about a seat axis A2 (see FIG. 8). The seat axis A2 is arranged perpendicular to and spaced vertically above the aperture axis A1. The first and second seats 140A, 140B each have a generally rectangular profile that is configured to support the intermediate element 128, as described in greater detail below.

In the representative embodiment illustrated herein, the tappet body 130 is formed as a unitary, one-piece component, manufactured from materials such as steel. In the first embodiment of the tappet assembly 108 illustrated in FIGS. 2-8, the tappet body 130 is manufactured by a drawing process. Here, the apertures 138 and the first and second seats 140A, 140B may be formed in the tappet body 130 during the drawing process used to form the tappet body 130. However, other machining methods such as drilling and electrical discharge machining (EDM) may also be used. As will be discussed in greater detail below in connection with the embodiments of the tappet assembly depicted in FIGS. 12-18, manufacturing processes other than drawing may be utilized to facilitate forming the tappet body, such as stamping, rolling, and grinding processes.

Referring now to FIGS. 7-8, the follower assembly 126 of the tappet assembly 108 includes a shaft 142 and first and second bearings, generally indicated at 144A and 144B, respectively. The first and second bearings 144A, 144B are each supported for rotation on the shaft 142. In the representative embodiment illustrated in FIGS. 7-8, the first and second bearings 144A, 144B are realized as roller bearing assemblies. However, as will be appreciated from the subsequent description of the embodiments illustrated in FIGS. 9-11 below, other configurations of the first and second bearings 144A, 144B are contemplated by the present disclosure (e.g., hydrodynamic journal bearings).

Figure 4:
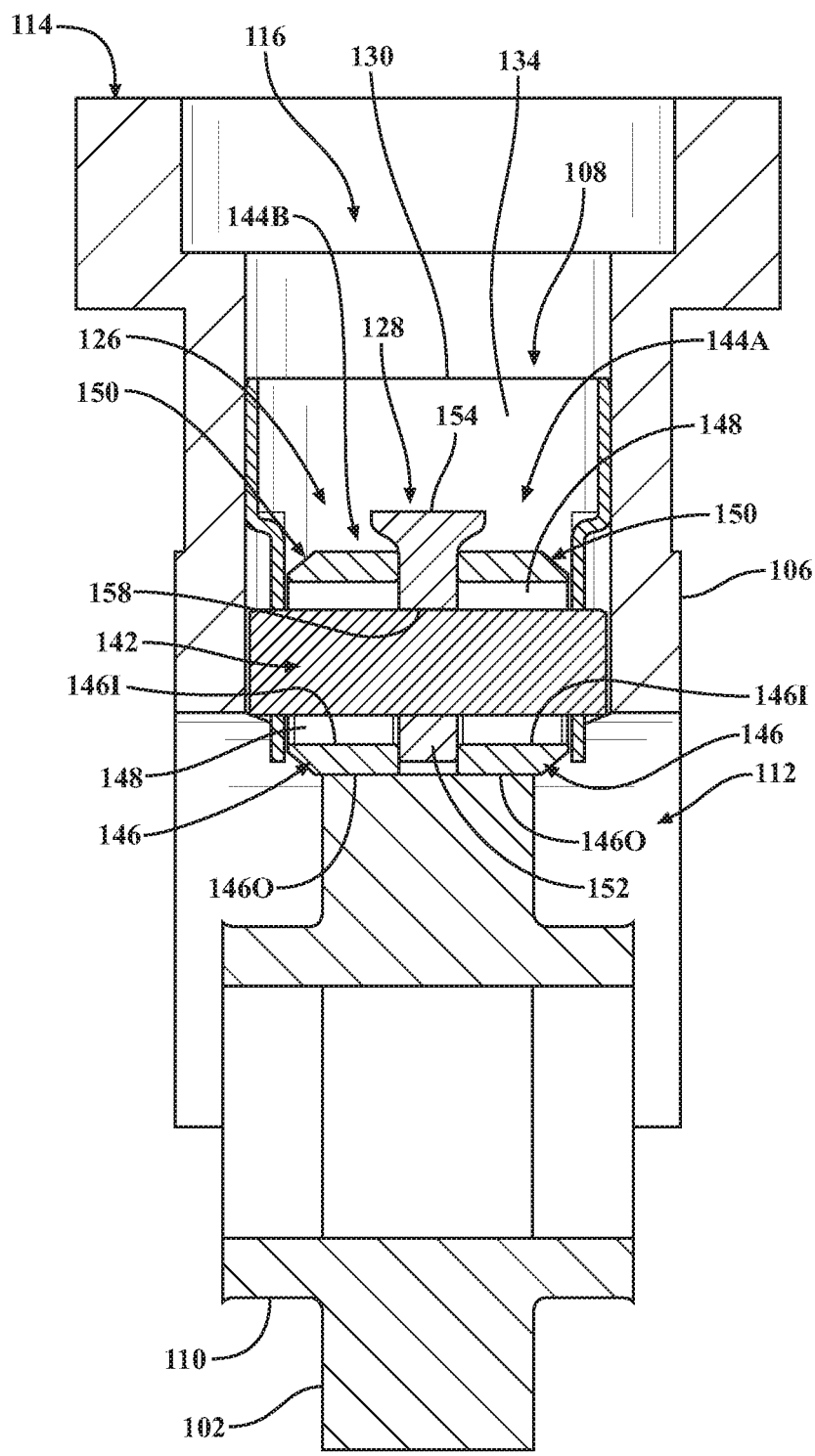
FIG. 4 is a section view taken along line 4-4 in FIG. 2, shown depicting portions of the housing, the tappet assembly, and the camshaft lobe.

Referring now to FIGS. 2-8, the first and second bearings 144A, 144B each extend beneath the bottom of the tappet body 130 so as to engage the camshaft lobe 102 and follow the profile of the camshaft lobe 102 as the camshaft 110 rotates in operation (see FIGS. 3-4). Here, rotation of the camshaft 110 is translated into reciprocal movement of the tappet assembly 108 within the tappet cylinder 116 as the first and second bearings 144A, 144B of the follower assembly 126 roll along the profile of the camshaft lobe 102. The follower assembly 126 is coupled to the intermediate element 128 which, in turn, is supported by the tappet body 130 and is interposed between the first bearing 144A and the second bearing 144B along the shaft 142. As will be appreciated from the subsequent description below, the follower assembly 126, the intermediate element 128, and/or the tappet body 130 can be configured in a number of different ways, such as to accommodate different application requirements of correspondingly-different high-pressure fuel systems 100, without departing from the scope of the present invention.

Those having ordinary skill in the art will appreciate that various application-specific requirements (e.g., reciprocating mass, load, geometry, packing requirements, and the like) may necessitate that one or more components of the tappet assembly 108 be configured in certain ways so as to ensure that the high-pressure fuel system 100 operates consistently and reliably. Here, different materials and/or manufacturing processes may be employed to promote the reduction of contact stresses, such as by increasing contact area between two surfaces. By way of illustrative example, by maximizing the width of each of the first and second bearings 144A, 144B of the follower assembly 126, contact stress occurring between the respective bearings 144A, 144B and the shaft 142 may be reduced.

In the representative embodiment of the tappet assembly 108 depicted in FIGS. 2-8, the first and second bearings 144A, 144B of the follower assembly 126 each include an outer race 146, which is adapted to engage the camshaft lobe 102, and a plurality of rollers 148 arranged between the outer race 146 and the shaft 142 (see FIGS. 4 and 7-8). The rollers 148 reduce friction and help distribute load between the shaft 142 and the first and second bearings 144A, 144B during operation. The outer race 146 comprises an outer portion 1460 that is adapted to at least partially engage the camshaft lobe 102, and an inner portion 1461 that is adapted to engage the rollers 148. In some embodiments of the present disclosure, including without limitation the first embodiment of the tappet assembly 108 illustrated in FIGS. 2-8, each of the first and second bearings 144A, 144B may have a chamfered edge 150 to provide clearance for the bearings 144A, 144B between the inner surface 134 of the tappet body 130 adjacent the respective apertures 138 and indented walls 136. The chamfered edges 150 of the bearings 144A, 144B face away from each other in the illustrated embodiment such that the bearings 144A, 144B have a generally asymmetric profile.

Here in the first embodiment of the tappet assembly 108, and as is best shown in FIG. 4, the chamfered edge 150 is formed on one side of the outer portion 148 of the outer race 146 of each of the bearings 144A, 144B (a smaller chamfer may be provided on the other side of the outer portion 148 in some embodiments; not shown in detail). This configuration allows the width of the outer portion 1460 to maximize contact with the camshaft lobe 102 while still facilitating packaging of the follower assembly 126 within the tappet body 130 and, at the same time, allows both the width of the inner portion 1461 and the length of the rollers 148 to be maximized so as to distribute load across a maximized length of the shaft 142 while generally reducing the rotating mass of the bearings 144A, 144B.

With continued reference to FIGS. 2-8, the intermediate element 128 of the follower assembly 126 includes a central portion 152, a platform 154, and first and second protrusions 156A, 156B. The platform 154 is formed on the central portion 152 of the intermediate element 128 and provides a contact surface that is arranged to engage the spring-loaded piston 122 of the high-pressure fuel pump assembly 104 in force translating relationship (see FIG. 5; engagement not shown). Each of the first protrusion 156A and the second protrusion 156B extends from the central portion 152 and generally away from the platform 154 in opposing directions. A bore 158 is further formed in the central portion 152 and is configured to receive the shaft 142 of the follower assembly 126. The platform 154 is disposed slightly above the protrusions 156A, 156B and spaced from the bore 158 such that the platform 154 is spaced from the bearings 144A, 144B and extends outwardly toward the tappet body 130 allowing the contact surface between the spring-loaded piston 122 of the high-pressure fuel pump assembly 104 to be enlarged.

Each of the protrusions 156A, 156B of the intermediate element 128 has a generally rectangular profile and is configured to be accommodated or otherwise received by one of the respective first and second seats 140A, 140B of the tappet body 130 (see FIG. 4). The intermediate element 128 further comprises a guide tip 160 extending from at least one of the protrusions 156A, 156B through the respective first or second seat 140A, 140B and protruding from the tappet body 130. When the intermediate element 128 is seated in one of the first and second seats 140A, 140B of the tappet body 130, the guide tip 160 protrudes beyond the outer surface 132 of the tappet body 130 to be received in and travel along the guide slot 118 of the housing 106 (see FIG. 3). This configuration indexes the tappet assembly 108 within the tappet cylinder 116 and prevents rotation of the tappet assembly 108 with respect to the camshaft lobe 102 and the high-pressure fuel pump assembly 104, as will be discussed in further detail below. In the representative embodiment illustrated in FIGS. 2-8, the first protrusion 156A includes the guide tip 160, which extends through the first seat 140A further away from the central portion 152 and protrudes from the tappet body 130.

As is best shown in FIG. 4, the central portion 152 of the intermediate element 128 is interposed axially between the first and second bearings 144A, 144B. Here, the bore 158 of the intermediate element 128 is aligned with the apertures 138 of the tappet body 130 and with the shaft 142. Thus, the shaft 142 extends through the apertures 138, the first and second bearings 144A, 144B, and the bore 158 of the intermediate element 128. The shaft 142 may be retained relative to the tappet body 130 by upsetting opposing ends of the shaft 142 to a diameter larger than the apertures 138. Each end may be upset by staking, flaring, or otherwise effectively enlarging opposing ends of the shaft 142 to a size larger than the apertures 138. The shaft 142 is retained axially in the tappet body 130 but able to rotate within the apertures 138 and the intermediate element 128. In some embodiments, the shaft 142 may be fixed against rotation relative to the intermediate element 128 and/or the tappet body 130. The indented walls 136 provide clearance between the enlarged opposing ends of the shaft 142 and the tappet cylinder 116. However, other configurations are contemplated, and those having ordinary skill in the art will appreciate that the shaft 142 could be configured in any suitable way sufficient to be retained and engage the intermediate element 128, as noted above, without departing from the scope of the present invention.

In the embodiments illustrated herein, the intermediate element 128 of the follower assembly 126 is formed as a unitary, one-piece component. More specifically, in the first embodiment of the tappet assembly 108 illustrated in FIGS. 2-8, the intermediate element 128 is manufactured from a single piece of sheet steel that has been stamped and contoured to shape. In some embodiments, the platform 154 of the intermediate element 128 may be formed with a coining operation to widen the contact surface that is arranged to engage against the spring-loaded piston 122 of the high-pressure fuel pump assembly 104. However, as will be appreciated from the subsequent description of the embodiment illustrated in FIG. 18 below, other manufacturing processes, such as cold-forming, could be utilized. Furthermore, it is contemplated that still other manufacturing processes may be utilized for certain applications, such as casting, forging, metal injection molding, powdered metal sintering, and the like.

When the tappet assembly 108 is installed into the tappet cylinder 116 of the housing 106, and the high-pressure fuel pump assembly 104 is operatively attached to the flange 114 of the housing 106, the spring-loaded piston 122 engages against the platform 154 of the intermediate element 128 with the follower assembly 126 engaging the camshaft lobe 102. The camshaft lobe 102 urges the follower assembly 126 toward the high-pressure fuel pump assembly 104, where forces are transferred from each of the first and second bearings 144A, 144B to the shaft 142, through the intermediate element 128, and to the spring-loaded piston 122 of the high-pressure fuel pump assembly 104. Additionally, engagement between the protrusions 156A, 156B and the seats 140A, 140B effects concurrent movement of the intermediate element 128 and the tappet body 130 as the tappet assembly 108 reciprocates within the tappet cylinder 116.

Figure 9:
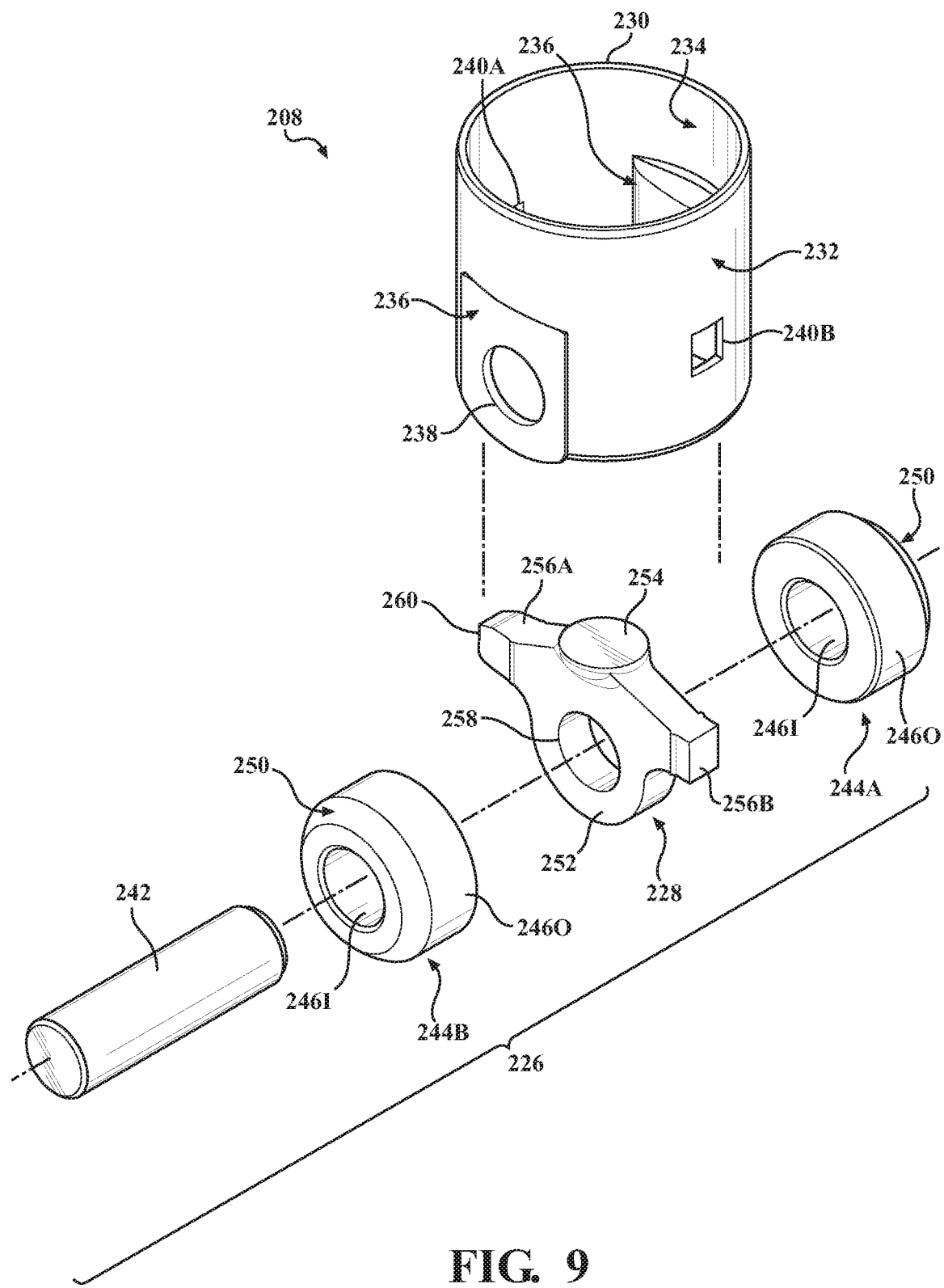
FIG. 9 is an exploded perspective view of a second embodiment of a tappet assembly according to the present invention.

As noted above, a second embodiment of the tappet assembly of the present invention is shown in FIG. 9. As will be appreciated from the subsequent description below, the second embodiment is similar to the first embodiment of the tappet assembly 108 described above in connection with FIGS. 2-8. As such, the components and structural features of the second embodiment of the tappet assembly that are the same as or that otherwise correspond to the first embodiment of the tappet assembly 108 are provided with the same reference numerals increased by 100. While the specific differences between these embodiments will be described in detail, for the purposes of clarity and consistency, only certain structural features and components common between these embodiments will be discussed and depicted in the drawing(s) of the second embodiment of the tappet assembly 208. Here, unless otherwise indicated, the above description of the first embodiment of the tappet assembly 108 may be incorporated by reference with respect to the second embodiment of the tappet assembly 208 without limitation.

Referring now to FIG. 9, the second embodiment of the tappet assembly 208 is shown. In this embodiment, the bearings 244A, 244B of the follower assembly 226 are realized as hydrodynamic journal bearings that are rotatably supported via the shaft 242. Here too in this second embodiment of the tappet assembly 208, each of the first and second bearings 244A, 244B employs the chamfered edge 250 to provide clearance for the bearings 244A, 244B between the inner surface 234 of the tappet body 230 adjacent the respective indented walls 236. Furthermore, because a journal bearing configuration is employed in this embodiment, the inner portion 246I is disposed in engagement (e.g., via hydrodynamic "contact") with the shaft 242 and is wider than the outer portion 246O. This likewise allows the width of the outer portion 246O to maximize contact with the camshaft lobe 102 while still facilitating packaging of the follower assembly 226 within the tappet body 230 and, at the same time, allows the width of the inner portion 246I to be maximized so as to distribute load across a maximized length of the shaft 242 while generally reducing the rotating mass of the bearings 244A, 244B.

Figure 10:
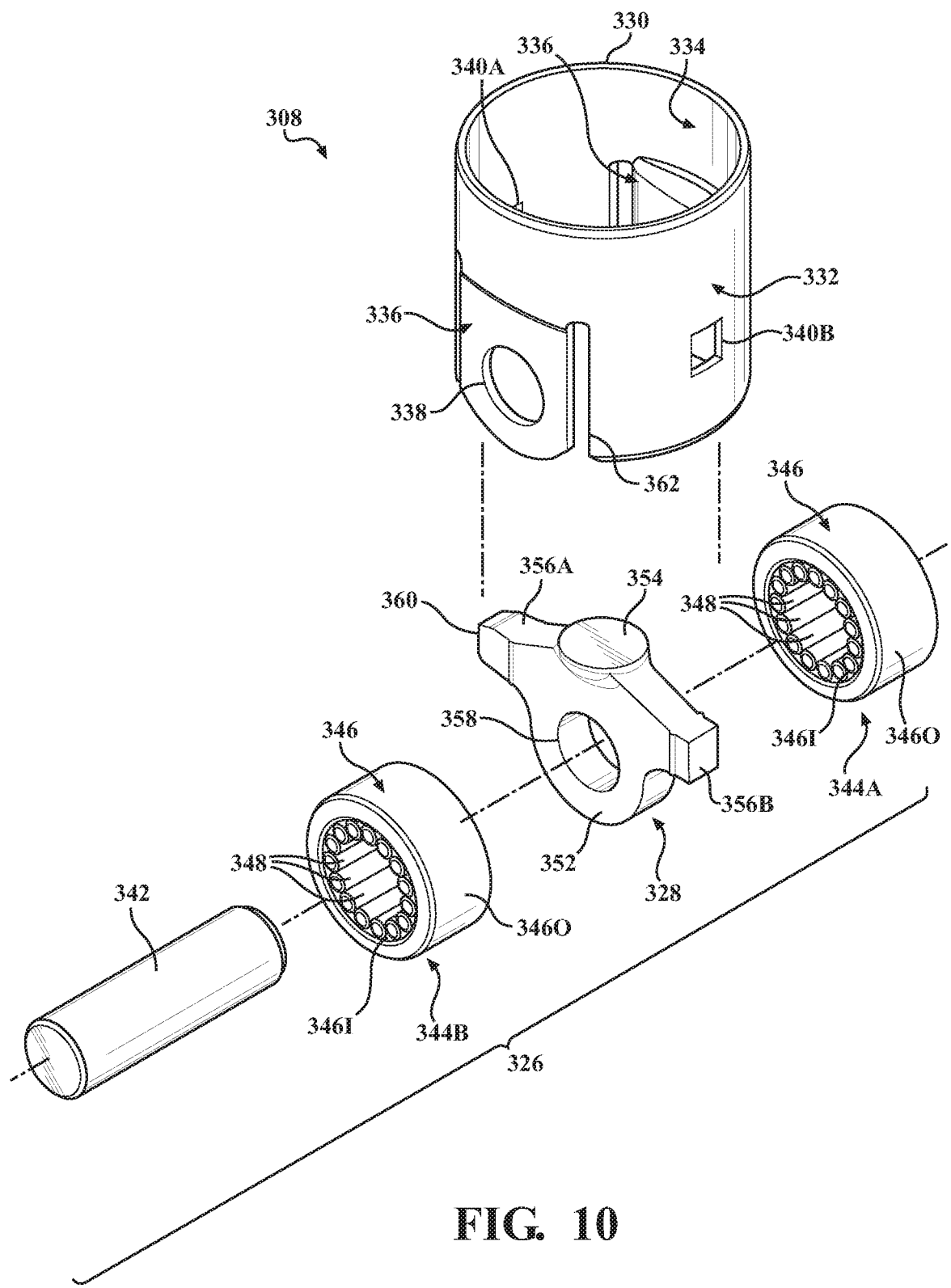
FIG. 10 is a partially-exploded perspective view of a third embodiment of a tappet assembly according to the present invention.

As noted above, a third embodiment of the tappet assembly of the present invention is shown in FIG. 10. As will be appreciated from the subsequent description below, the third embodiment is similar to the first embodiment of the tappet assembly 108 described above in connection with FIGS. 2-8. As such, the components and structural features of the third embodiment of the tappet assembly that are the same as or that otherwise correspond to the first embodiment of the tappet assembly 108 are provided with the same reference numerals increased by 200. While the specific differences between these embodiments will be described in detail, for the purposes of clarity and consistency, only certain structural features and components common between these embodiments will be discussed and depicted in the drawing(s) of the third embodiment of the tappet assembly 308. Here, unless otherwise indicated, the above description of the first embodiment of the tappet assembly 108 may be incorporated by reference with respect to the third embodiment of the tappet assembly 308 without limitation.

Referring now to FIG. 10, the third embodiment of the tappet assembly 308 is shown. Here too in this embodiment, the tappet body 330 has an outer surface 332 and an inner surface 334, each having a generally cylindrical profile. Likewise, indented walls 336 are formed on the tappet body 330 arranged diametrically opposed from each other. However, in this third embodiment, slots 362 are formed in the tappet body 330 adjacent to longitudinal edges of the indented walls 336. The slots 362 facilitate positioning the inner surface 334 of the indented walls 336 in a way that affords additional clearance for the bearings 344A, 344B of the follower assembly 326. In this embodiment, the bearings 344A, 344B are likewise realized as roller bearings but are provided with a substantially more symmetric profile without distinct chamfered edges that face away from each other (compare FIG. 10 with FIG. 8). The configuration afforded by the third embodiment of the tappet assembly 308 may be advantageously implemented in applications where the camshaft lobe 102 is relatively wide and/or where additional engagement between the bearings 344A, 344B and the camshaft lobe 102 is desirable (e.g., to reduce contact stress during operation).

Figure 11:
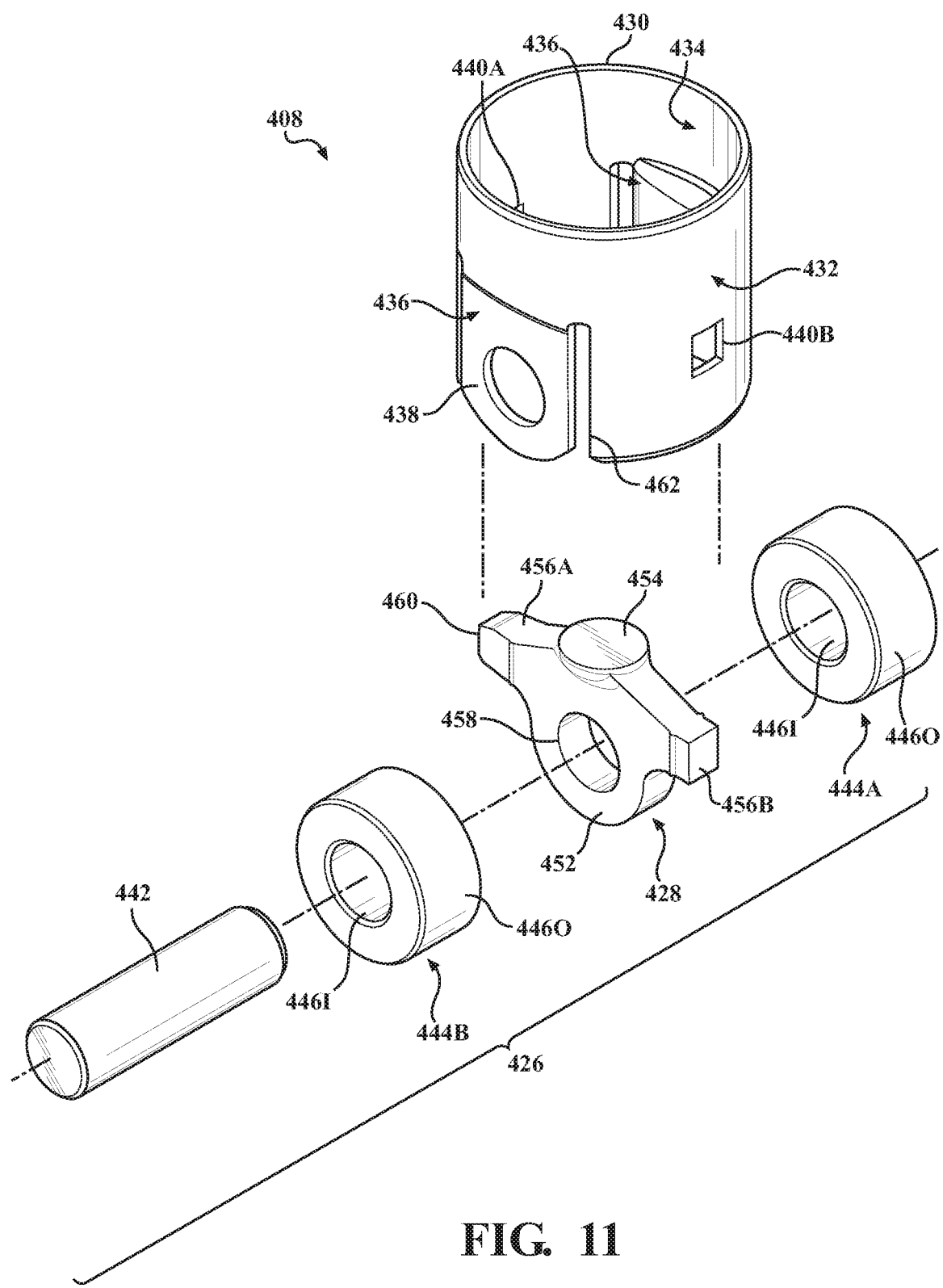
FIG. 11 is an exploded perspective view of a fourth embodiment of a tappet assembly according to the present invention.

As noted above, a fourth embodiment of the tappet assembly of the present invention is shown in FIG. 11. As will be appreciated from the subsequent description below, the fourth embodiment is similar to the first embodiment of the tappet assembly 108 described above in connection with FIGS. 2-8. As such, the components and structural features of the fourth embodiment of the tappet assembly that are the same as or that otherwise correspond to the first embodiment of the tappet assembly 108 are provided with the same reference numerals increased by 300. While the specific differences between these embodiments will be described in detail, for the purposes of clarity and consistency, only certain structural features and components common between these embodiments will be discussed and depicted in the drawing(s) of the fourth embodiment of the tappet assembly 408. Here, unless otherwise indicated, the above description of the first embodiment of the tappet assembly 108 may be incorporated by reference with respect to the fourth embodiment of the tappet assembly 408 without limitation.

Referring now to FIG. 11, the fourth embodiment of the tappet assembly 408 is shown. In addition to sharing similar components and structural features with the first embodiment as noted above, the fourth embodiment of the tappet assembly 408 is also similar, in certain aspects, to the second embodiment of the tappet assembly 208 described above in connection with FIG. 9, and to the third embodiment of the tappet assembly 308 described above in connection with FIG. 10. Specifically, the fourth embodiment of the tappet assembly 408, like the second embodiment of the tappet assembly 208, employs bearings 444A, 444B, which have a journal bearing configuration. Accordingly, the description of this aspect above in connection with the second embodiment may be incorporated by reference with respect to the fourth embodiment of the tappet assembly 408. Furthermore, the fourth embodiment of the tappet assembly 408, like the third embodiment of the tappet assembly 308, employs slots 462 formed in the tappet body 430 adjacent to longitudinal edges of the indented walls 436, and bearings 444A, 444B, which have a substantially symmetric profile without distinct chamfered edges that face away from each other. Accordingly, the above description of these aspects in connection with the third embodiment may be incorporated by reference with respect to the fourth embodiment of the tappet assembly 408.

Figure 12:
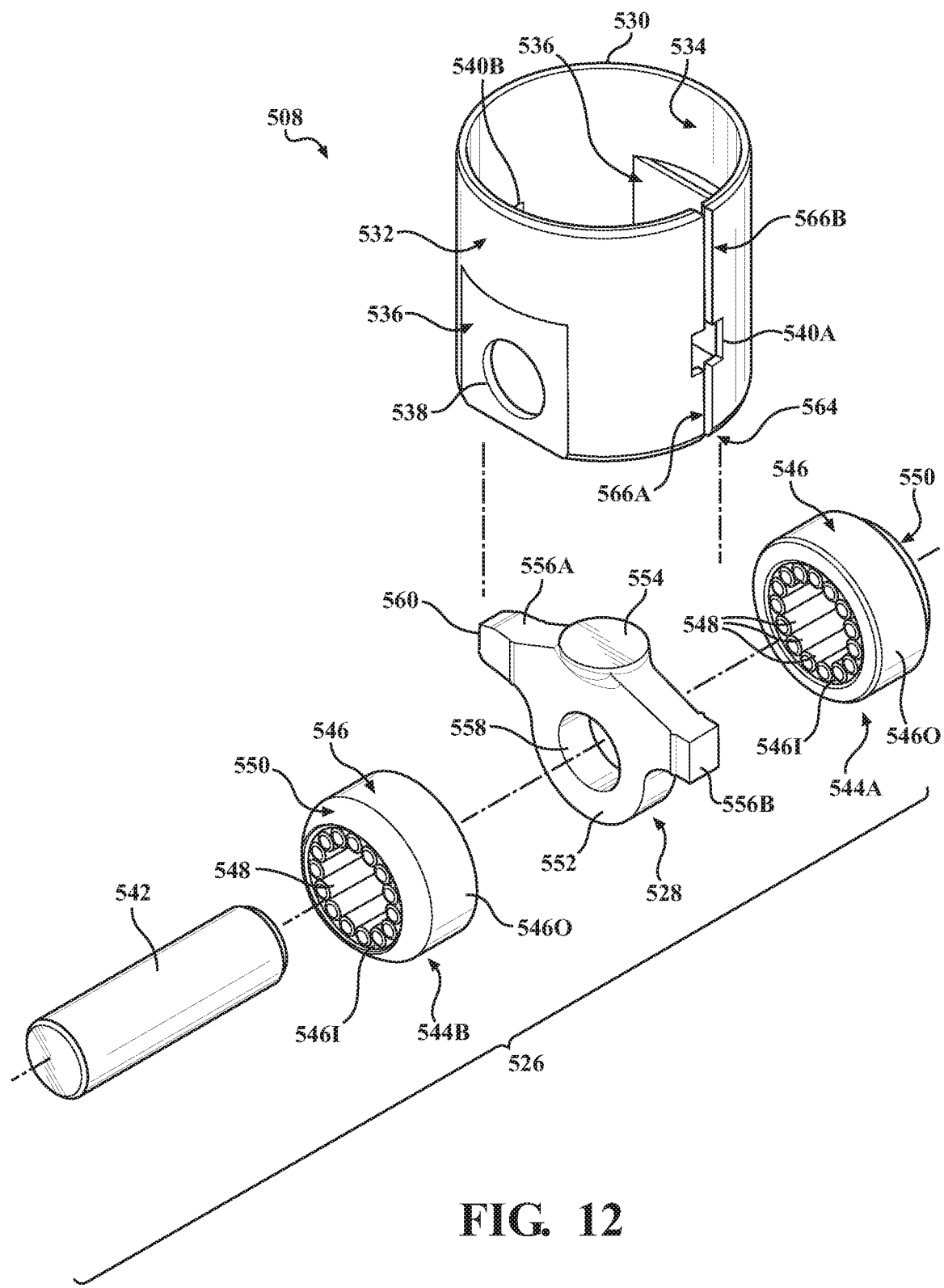
FIG. 12 is a partially-exploded perspective view of a fifth embodiment of a tappet assembly according to the present invention.

As noted above, a fifth embodiment of the tappet assembly of the present invention is shown in FIG. 12. As will be appreciated from the subsequent description below, the fifth embodiment is similar to the first embodiment of the tappet assembly 108 described above in connection with FIGS. 2-8. As such, the components and structural features of the fifth embodiment of the tappet assembly that are the same as or that otherwise correspond to the first embodiment of the tappet assembly 108 are provided with the same reference numerals increased by 400. While the specific differences between these embodiments will be described in detail, for the purposes of clarity and consistency, only certain structural features and components common between these embodiments will be discussed and depicted in the drawing(s) of the fifth embodiment of the tappet assembly 508. Here, unless otherwise indicated, the above description of the first embodiment of the tappet assembly 108 may be incorporated by reference with respect to the fifth embodiment of the tappet assembly 508 without limitation.

Referring now to FIG. 12, the fifth embodiment of the tappet assembly 508 is shown. In this embodiment, a longitudinal split 564 is formed in the tappet body 530, arranged extending through one of the seats 540A, 540B. Here, the tappet body 530 may be manufactured via a stamping operation, such as where stamped sheet steel is rolled to form a generally annular profile with a longitudinal split 564 that defines first and second edges 566A, 566B, which face each other across the longitudinal split 564. The longitudinal split 564 is arranged in the tappet body 530 approximately perpendicular to the indented walls 536 and the apertures 538. This arrangement causes the longitudinal split 564 to bisect the first seat 540A. In some embodiments, each the edges 566A, 566B may be coupled to each other using various techniques known in the art, such as brazing, soldering, welding, and the like.

In order to promote ease of manufacture, in some embodiments, the tappet body 530 may be formed resiliently so as to allow relative movement between the first and second edges 566A, 566B. Here, the tappet body 530 could be formed such that its profile is larger than the diameter of the tappet cylinder 116. When installed in the tappet cylinder 116, the tappet body 530 could at least partially compress to bring the first and second edges 566A, 566B closer toward each other, and one or more portions of the tappet body 530 could thus engage against and apply force to the tappet cylinder 116. Those having ordinary skill in the art will appreciate that the tappet body 530 could be configured in ways other than with the illustrated longitudinal split 564 where the first and second edges 566A, 566B are spaced from and movable relative to each other. For example, an interlocking split could be utilized in some embodiments, such as various arrangements of vertical, horizontal, curved, and/or angled splits that extend in communication between each other (not shown), where one or more edges define a tab and a slot that are configured to interlock with each other to promote rigidity. Other configurations are contemplated.

Figure 13:
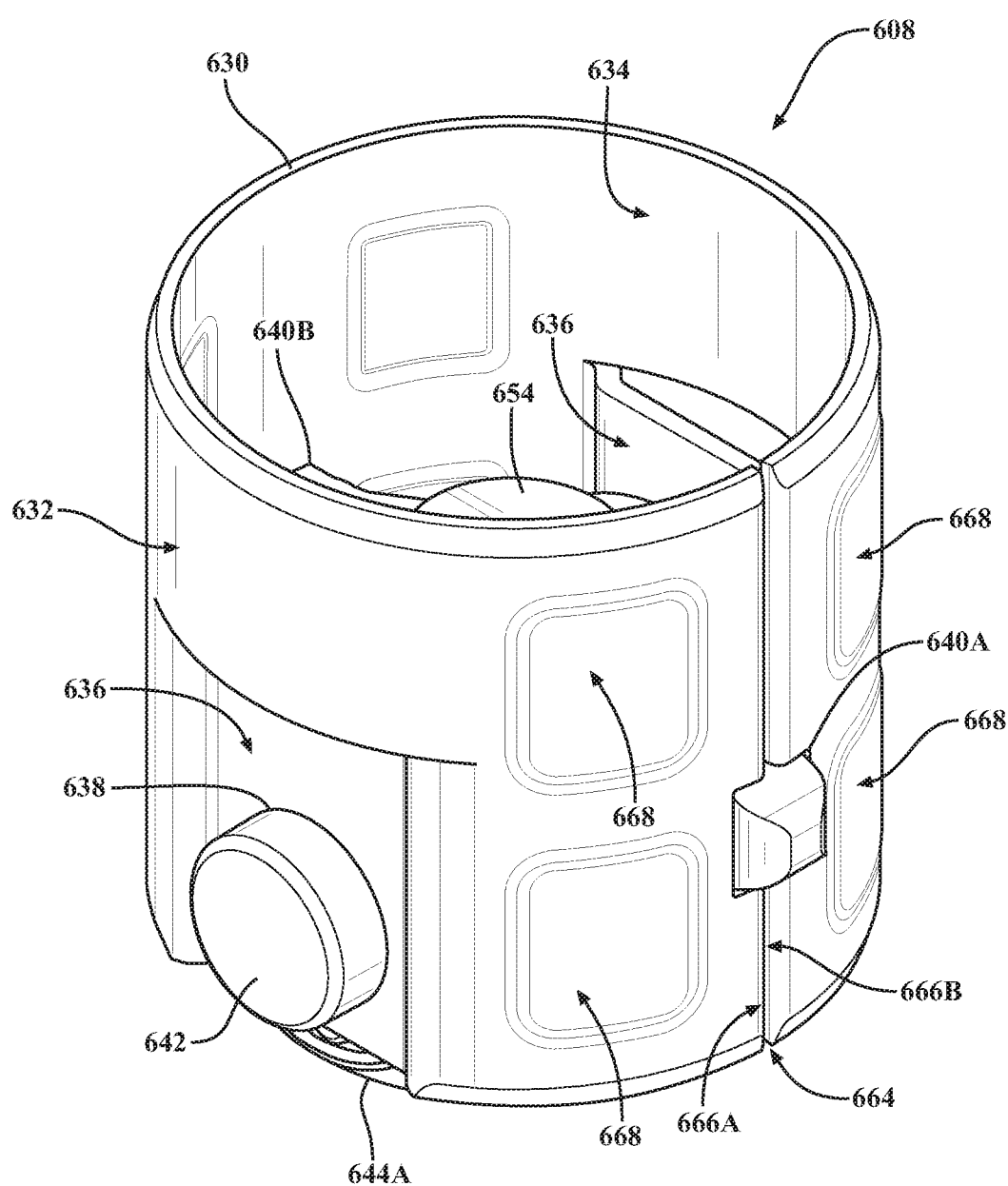
FIG. 13 is a perspective view of a sixth embodiment of a tappet assembly according to the present invention.

As noted above, a sixth embodiment of the tappet assembly of the present invention is shown in FIG. 13. As will be appreciated from the subsequent description below, the sixth embodiment is similar to the first embodiment of the tappet assembly 108 described above in connection with FIGS. 2-8. As such, the components and structural features of the sixth embodiment of the tappet assembly that are the same as or that otherwise correspond to the first embodiment of the tappet assembly 108 are provided with the same reference numerals increased by 500. While the specific differences between these embodiments will be described in detail, for the purposes of clarity and consistency, only certain structural features and components common between these embodiments will be discussed and depicted in the drawing(s) of the sixth embodiment of the tappet assembly 608. Here, unless otherwise indicated, the above description of the first embodiment of the tappet assembly 108 may be incorporated by reference with respect to the sixth embodiment of the tappet assembly 608 without limitation.

Referring now to FIG. 13, the sixth embodiment of the tappet assembly 608 is shown. In addition to sharing similar components and structural features with the first embodiment as noted above, the sixth embodiment of the tappet assembly 608 is also similar, in certain aspects, to the fifth embodiment of the tappet assembly 508 described above in connection with FIG. 12. Specifically, the sixth embodiment of the tappet assembly 608, like the fifth embodiment of the tappet assembly 508, is provided with a longitudinal split 664 formed in the tappet body 630. Accordingly, the description of this aspect above in connection with the fifth embodiment may be incorporated by reference with respect to the sixth embodiment of the tappet assembly 608.

With continued reference to FIG. 13, the tappet body 630 is provided with a plurality of pads, generally indicated at 668, which are formed in the tappet body 630 to help optimize contact with the tappet cylinder 116. During use, contact between the tappet body 630 and the tappet cylinder 116 stabilizes the reciprocal movement of the tappet assembly 608, and friction from this contact causes wear. The pads 668 are arranged about the tappet body 630 and protrude from the outer surface 632 of the tappet body 630 and provide a contact area for contacting the tappet cylinder 116. The reduced size of the contact area reduces wear to the tappet body 630. In this sixth embodiment, the pads 668 are arranged in four pairs, for a total of eight pads 668, one of each pair being spaced longitudinally along the tappet body 630. To this end, the tappet body 630 may be formed such that the areas of the outer surface 632 between the pads 668 have no (or only minimal) contact with the tappet cylinder 116. In some embodiments, the pads 668 may be generally square-shaped with a curved arc-shaped and generally cylindrical profile that corresponds to the shape of the tappet cylinder 116, and may be formed such as via a coining process. Other configurations are contemplated.

Figure 14:
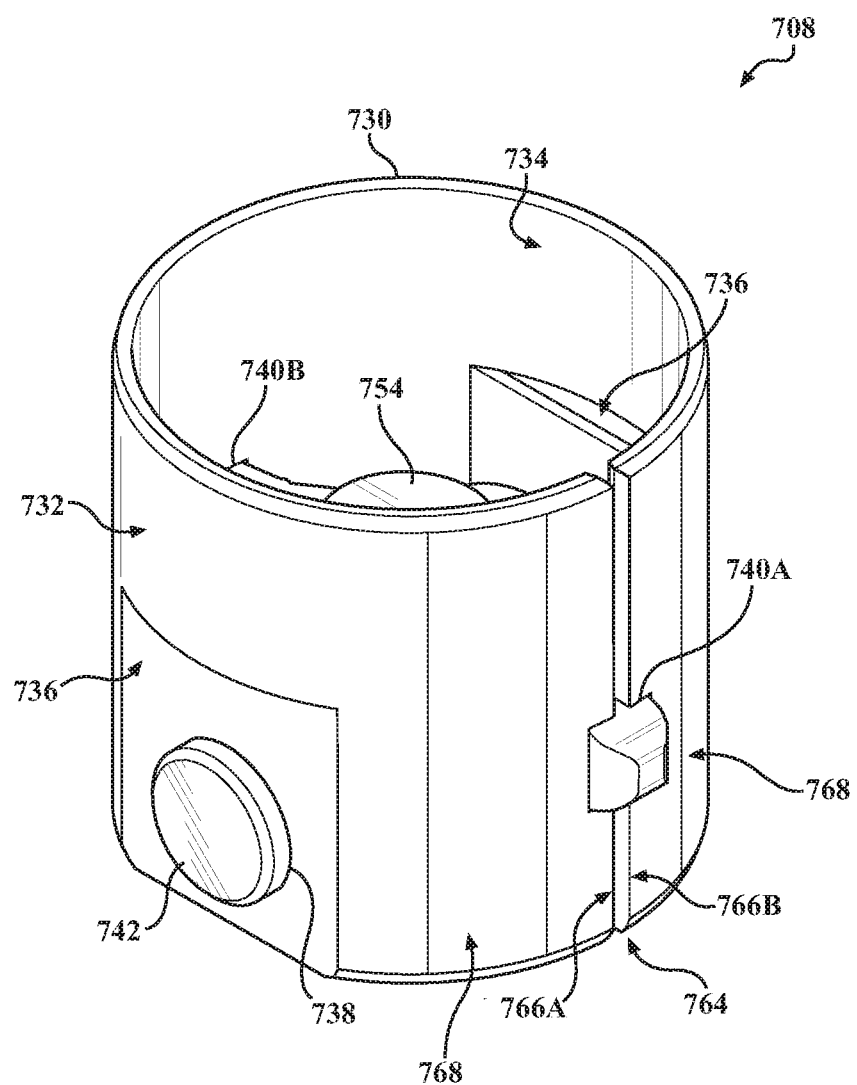
FIG. 14 is a perspective view of a seventh embodiment of a tappet assembly according to the present invention.

As noted above, a seventh embodiment of the tappet assembly of the present invention is shown in FIG. 14. As will be appreciated from the subsequent description below, the seventh embodiment is similar to the first embodiment of the tappet assembly 108 described above in connection with FIGS. 2-8. As such, the components and structural features of the seventh embodiment of the tappet assembly that are the same as or that otherwise correspond to the first embodiment of the tappet assembly 108 are provided with the same reference numerals increased by 600. While the specific differences between these embodiments will be described in detail, for the purposes of clarity and consistency, only certain structural features and components common between these embodiments will be discussed and depicted in the drawing(s) of the seventh embodiment of the tappet assembly 708. Here, unless otherwise indicated, the above description of the first embodiment of the tappet assembly 108 may be incorporated by reference with respect to the seventh embodiment of the tappet assembly 708 without limitation.

Referring now to FIG. 14, the seventh embodiment of the tappet assembly 708 is shown. In addition to sharing similar components and structural features with the first embodiment as noted above, the seventh embodiment of the tappet assembly 708 is also similar, in certain aspects, to the sixth embodiment of the tappet assembly 608 described above in connection with FIG. 13. Specifically, the seventh embodiment of the tappet assembly 708, like the sixth embodiment of the tappet assembly 608, is provided with a plurality of pads 768 radially arranged about the outer surface 732 of the tappet body 730, which is likewise formed with a longitudinal split 764. Accordingly, the description of this aspect above in connection with the sixth embodiment may be incorporated by reference with respect to the seventh embodiment of the tappet assembly 708.

With continued reference to FIG. 14, as noted above, the tappet body 730 is provided with a plurality of pads, generally indicated at 768, which are arranged about the outer surface 732. In this seventh embodiment, a total of four pads 768 (two shown in FIG. 14) are formed in the tappet body 730 to help optimize contact with the tappet cylinder 116 during use. Here, the pads 768 are generally elongated rectangular-shaped with a curved arc-shaped and generally cylindrical profile that corresponds to the shape of the tappet cylinder 116. However, it will be appreciated that other configurations, arrangements, profiles, and/or shapes of pads 768 may be employed in certain embodiments.

Figure 15:
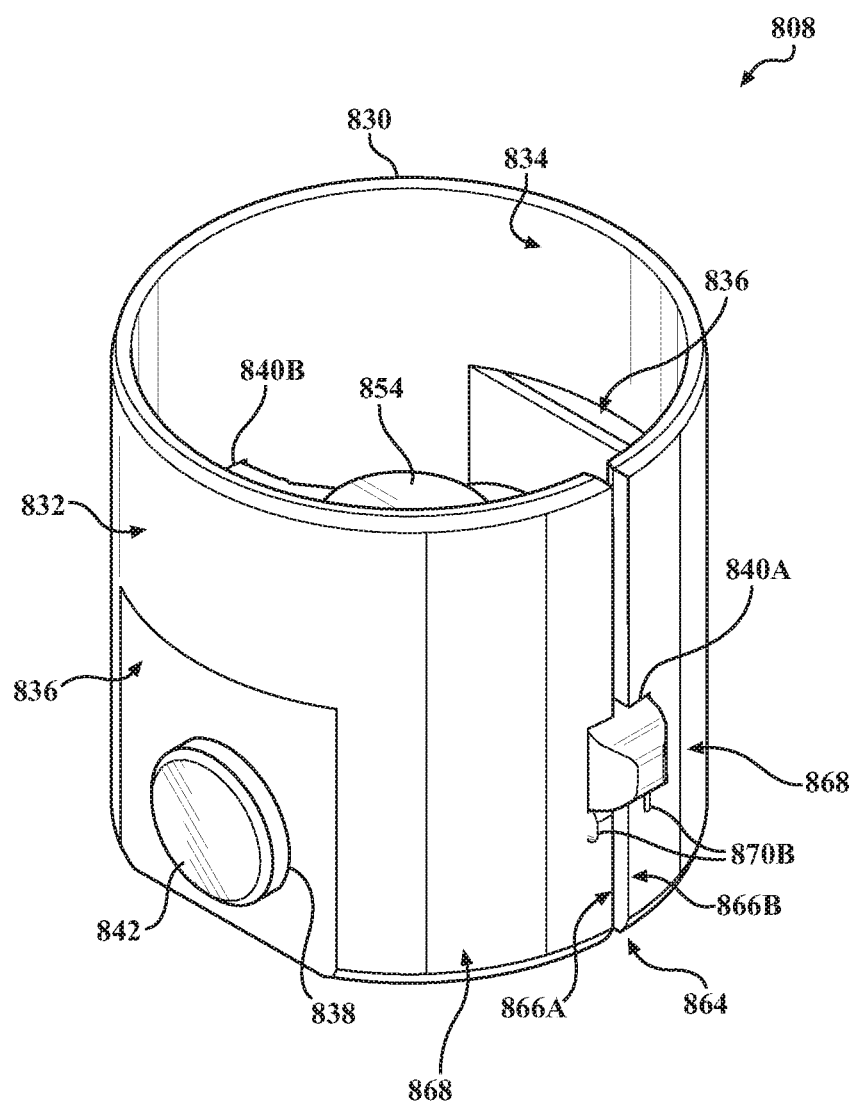
FIG. 15 is a perspective view of an eighth embodiment of a tappet assembly according to the present invention.
Figure 16:
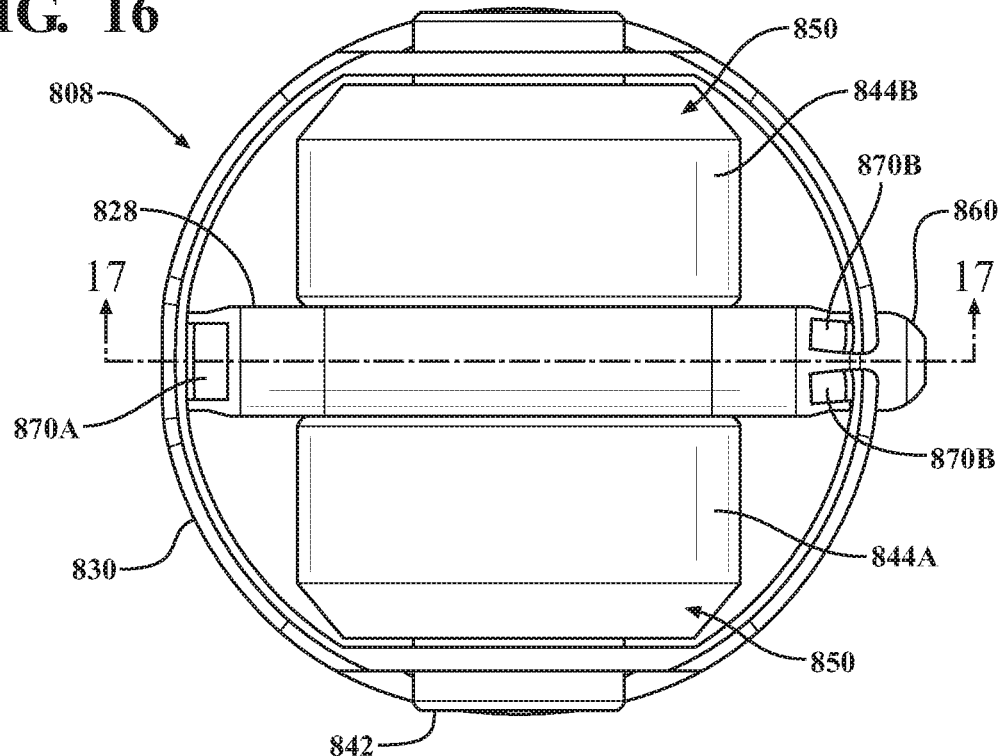
FIG. 16 is a bottom-side plan view of the eighth embodiment of the tappet assembly of FIG. 15.
Figure 17:
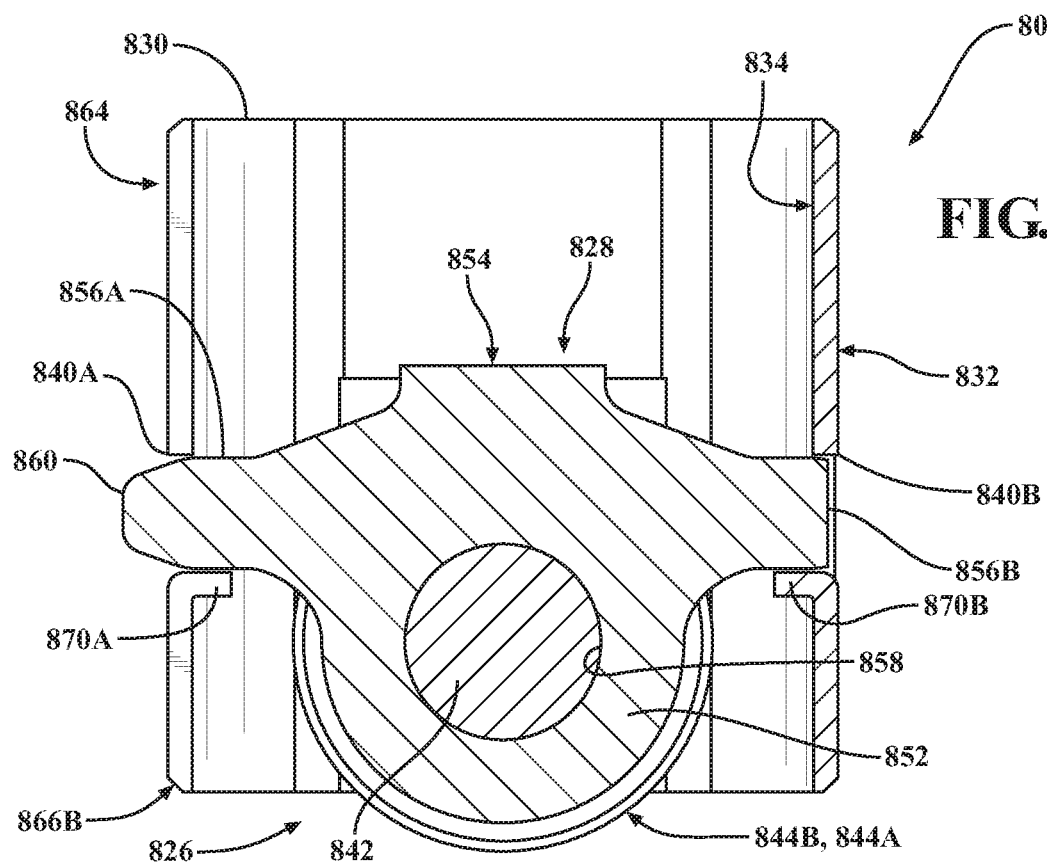
FIG. 17 is a section view taken along line 17-17 in FIG. 16.

As noted above, an eighth embodiment of the tappet assembly of the present invention is shown in FIGS. 15-17. As will be appreciated from the subsequent description below, the eighth embodiment is similar to the first embodiment of the tappet assembly 108 described above in connection with FIGS. 2-8. As such, the components and structural features of the eighth embodiment of the tappet assembly that are the same as or that otherwise correspond to the first embodiment of the tappet assembly 108 are provided with the same reference numerals increased by 700. While the specific differences between these embodiments will be described in detail, for the purposes of clarity and consistency, only certain structural features and components common between these embodiments will be discussed and depicted in the drawing(s) of the eighth embodiment of the tappet assembly 808. Here, unless otherwise indicated, the above description of the first embodiment of the tappet assembly 108 may be incorporated by reference with respect to the eighth embodiment of the tappet assembly 808 without limitation.

Referring now to FIGS. 15-17, the eighth embodiment of the tappet assembly 808 is shown. In addition to sharing similar components and structural features with the first embodiment as noted above, the eighth embodiment of the tappet assembly 808 is also similar, in certain aspects, to the seventh embodiment of the tappet assembly 708 described above in connection with FIG. 14. Specifically, the eighth embodiment of the tappet assembly 808, like the seventh embodiment of the tappet assembly 708, is provided with a plurality of pads 868 radially arranged about the outer surface 832 of the tappet body 830, which is likewise formed with a longitudinal split 864. Accordingly, the description of this aspect above in connection with the seventh embodiment may be incorporated by reference with respect to the eighth embodiment of the tappet assembly 808.

With continued reference to FIGS. 15-17, the eighth embodiment of the tappet assembly 808 is provided with one or more tabs, generally indicated at 870A, 870B, formed in the tappet body 830 adjacent to each of the seats 840A, 840B. More specifically, and as is best shown in FIGS. 16-17, a single tab 870A is formed adjacent to the first seat 840A, and a pair of smaller tabs 870B are formed adjacent to the second seat 840B. The tabs 870A, 870B are "bent" or otherwise formed extending inwardly, and are shaped and arranged to abut portions of the protrusions 856A, 856B and/or the guide tip 860 of the intermediate element 828 of the follower assembly 826. The tabs 870A, 870B also afford rigidity to the tappet body 830 and help to distribute applied load during use. It will be appreciated that the tabs 870A, 870B may be shaped and/or arranged in ways other than as is illustrated in FIGS. 15-17 without departing from the scope of the present invention.

Figure 18:
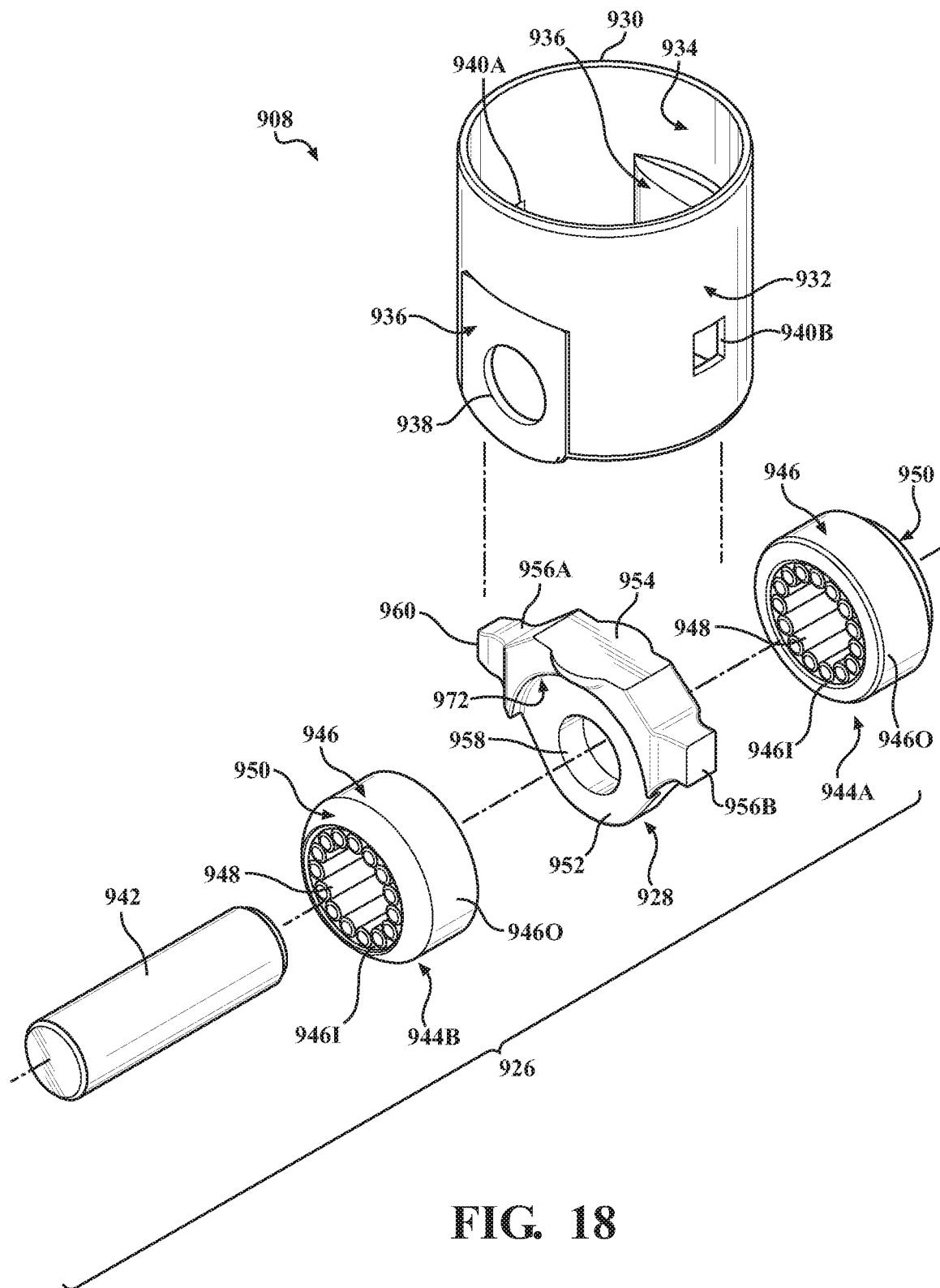
FIG. 18 is an exploded perspective view of a ninth embodiment of a tappet assembly according to the present invention.

As noted above, a ninth embodiment of the tappet assembly of the present invention is shown in FIG. 18. As will be appreciated from the subsequent description below, the ninth embodiment is similar to the first embodiment of the tappet assembly 108 described above in connection with FIGS. 2-8. As such, the components and structural features of the ninth embodiment of the tappet assembly that are the same as or that otherwise correspond to the first embodiment of the tappet assembly 108 are provided with the same reference numerals increased by 800. While the specific differences between these embodiments will be described in detail, for the purposes of clarity and consistency, only certain structural features and components common between these embodiments will be discussed and depicted in the drawing(s) of the ninth embodiment of the tappet assembly 908. Here, unless otherwise indicated, the above description of the first embodiment of the tappet assembly 108 may be incorporated by reference with respect to the ninth embodiment of the tappet assembly 908 without limitation.

Referring now to FIG. 18, the ninth embodiment of the tappet assembly 908 is shown. Here in this embodiment, the intermediate element 928 of the follower assembly 926 comprises a central portion 952 that defines pockets 972 for accommodating the bearings 944A, 944B. This allows the bearings 944A, 944B to be optimized for particular applications, such as to maximize contact with the camshaft lobe 102 as noted above, to enlarge the platform 954, and the like. Here in this embodiment, the intermediate element 928 may be manufactured by cold-forming or forging. Other configurations are contemplated.

Those having ordinary skill in the art will appreciate that various aspects, components, and/or structural features of the nine embodiments described herein can be combined, interchanged, or otherwise implemented with one another to accommodate various applications.

In this way, the embodiments of the tappet assembly of the present invention significantly reduce the cost and complexity of manufacturing and assembling high-pressure fuel systems 100 and associated components. Specifically, it will be appreciated that the cooperation between the intermediate element, the bearings, and the shaft of the follower assembly, and the tappet body promote reduced mass and increased stiffness without compromising performance. Further, it will be appreciated that the embodiments of the tappet assembly of the present invention afford opportunities for high-pressure fuel systems 100 with superior operational characteristics, such as improved performance, component life and longevity, efficiency, weight, load and stress capability, and packaging orientation.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A tappet assembly for use in translating force between a camshaft lobe and a fuel pump assembly via reciprocal movement within a tappet cylinder having a guide slot, said tappet assembly comprising:
a tappet body defining a pair of apertures and a pair of seats;
a follower assembly having a shaft, a first bearing and a second bearing each supported on said shaft for engaging the camshaft lobe; and
an intermediate element supported on said shaft between said first bearing and said second bearing and having a platform for engaging the fuel pump assembly, wherein said intermediate element is at least partially disposed in said pair of seats of said tappet body and said shaft is disposed in said pair of apertures of said tappet body.

2. The tappet assembly of claim 1, further comprising two indented walls formed in said tappet body, each indented wall defining one of said pair of apertures, and wherein said pair of apertures are arranged on an aperture axis.

3. The tappet assembly of claim 2, wherein said pair of seats are arranged on a seat axis, said seat axis arranged perpendicular to said aperture axis.

4. The tappet assembly of claim 2, wherein said shaft extends through said pair of apertures and protrudes from each of said indented walls.

5. The tappet assembly of claim 2, further comprising slots formed in said tappet body and arranged adjacent to each of said indented walls.

6. The tappet assembly of claim 1, wherein said tappet body defines an outer surface and an inner surface each having a generally annular profile, and wherein said follower assembly is arranged inside said tappet body.

7. The tappet assembly of claim 6, wherein said intermediate element comprises a central portion and two protrusions extending therefrom, wherein one of said protrusions is disposed in each of said pair of seats.

8. The tappet assembly of claim 7, wherein said intermediate element further comprises a guide tip extending from at least one of said protrusions and protruding through said outer surface of said tappet body for engaging the guide slot of the tappet cylinder.

9. The tappet assembly of claim 7, wherein said central portion of said intermediate element defines pockets for accommodating said first bearing and said second bearing.

10. The tappet assembly of claim 6, wherein said tappet body further defines a longitudinal split having a first edge and a second edge, said first edge facing said second edge across said longitudinal split.

11. The tappet assembly of claim 6, wherein said tappet body comprises pads formed in said tappet body and protruding from said outer surface for engaging the tappet cylinder.

12. The tappet assembly of claim 11, wherein said pads are further defined as pairs of pads, one of each of said pairs longitudinally spaced along said tappet body.

13. The tappet assembly of claim 11, wherein said pads are further defined as elongated pads, said elongated pads radially arranged about said outer surface of said tappet body.

14. The tappet assembly of claim 6, wherein said tappet body comprises tabs adjacent to each of said pair of seats for supporting said intermediate element.

15. The tappet assembly of claim 6, wherein each of said first bearing and said second bearing comprises a chamfered edge arranged adjacent to said tappet body for providing clearance between said first and second bearings and said tappet body.

16. The tappet assembly of claim 6, wherein said platform is spaced from said first bearing and said second bearing and extends outwardly toward said tappet body.

17. The tappet assembly of claim 6, wherein said first and second bearings extend beneath said tappet body for engaging the camshaft lobe.

18. The tappet assembly of claim 1, wherein each of said first bearing and said second bearing comprises an outer race and a plurality of rollers, said plurality of rollers arranged between said outer race and said shaft.

* * * * *